(12) United States Patent
Hwang et al.

(10) Patent No.: US 10,942,356 B2
(45) Date of Patent: Mar. 9, 2021

(54) WEARABLE GLASS DEVICE

(71) Applicant: LG ELECTRONICS INC., Seoul (KR)

(72) Inventors: Changkyu Hwang, Seoul (KR); Seungyong Shin, Seoul (KR); Sungkwon Jang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/286,235

(22) Filed: Feb. 26, 2019

(65) Prior Publication Data
US 2019/0265482 A1    Aug. 29, 2019

(30) Foreign Application Priority Data
Feb. 26, 2018 (KR) .................. 10-2018-0023024

(51) Int. Cl.
| | |
|---|---|
| *G02B 27/01* | (2006.01) |
| *G02C 11/00* | (2006.01) |
| *G01C 3/08* | (2006.01) |
| *G09G 3/02* | (2006.01) |
| *G06T 7/521* | (2017.01) |

(Continued)

(52) U.S. Cl.
CPC .......... *G02B 27/0172* (2013.01); *G01C 3/08* (2013.01); *G02B 13/16* (2013.01); *G02B 26/101* (2013.01); *G02B 27/0176* (2013.01); *G02B 27/0179* (2013.01); *G02C 11/10* (2013.01); *G06T 7/521* (2017.01); *G09G 3/02* (2013.01); *G02B 2027/0138* (2013.01); *G02B 2027/0178* (2013.01); *G02B 2027/0185* (2013.01); *G06T 2207/10028* (2013.01); *G09G 2320/0626* (2013.01); *G09G 2340/0407* (2013.01)

(58) Field of Classification Search
CPC .. G02B 27/0172; G02B 13/16; G02B 26/101; G02B 27/0176; G06T 7/521; G01C 3/08
See application file for complete search history.

(56) References Cited

U.S. PATENT DOCUMENTS

| | | | |
|---|---|---|---|
| 2011/0069275 A1* | 3/2011 | Ohno | ................. G02C 5/2263 351/113 |
| 2011/0242293 A1* | 10/2011 | Kikuchi | ................. G02B 30/24 348/51 |

(Continued)

*Primary Examiner* — Sarah Lhymn
(74) *Attorney, Agent, or Firm* — Birch, Stewart, Kolasch & Birch, LLP

(57) ABSTRACT

The present invention relates to a wearable glass device. The wearable glass device according to an embodiment of the present invention includes a left eye glass and a right eye glass; a frame for supporting the left eye glass and the right eye glass; a left hinge and a right hinge connected to the frame and pivotable; a left temple and a right temple connected respectively to the left hinge and the right hinge; and an optical device attached to any one of the left temple and the right temple, wherein an image projected from the optical device is outputted and displayed forward, when any one of the left temple and the right temple to which the optical device is attached is folded, and the image projected from the optical device is displayed on any one of the left eye glass and the right eye glass, when any one of the left temple and the right temple to which the optical device is attached is unfolded. Thus, when any one of the left temple and the right temple is folded, the image projected from the optical device can be outputted to the outside.

14 Claims, 26 Drawing Sheets

(51) Int. Cl.
*G02B 13/16* (2006.01)
*G02B 26/10* (2006.01)

(56) References Cited

U.S. PATENT DOCUMENTS

| | | | |
|---|---|---|---|
| 2011/0267321 A1* | 11/2011 | Hayakawa | G02B 27/0093 |
| | | | 345/204 |
| 2013/0235331 A1* | 9/2013 | Heinrich | G02C 11/10 |
| | | | 351/158 |
| 2014/0085190 A1* | 3/2014 | Erinjippurath | G02B 27/0172 |
| | | | 345/156 |
| 2017/0277222 A1* | 9/2017 | Matsuzawa | G06F 1/1647 |
| 2018/0329511 A1* | 11/2018 | Aman | A63H 30/04 |
| 2019/0212563 A1* | 7/2019 | Schultz | G02B 27/0172 |

* cited by examiner

WEARABLE GLASS DEVICE

CROSS-REFERENCE TO RELATED APPLICATION

This application claims the benefit of Korean Patent Application No. 10-2018-0023024, filed on Feb. 26, 2018 in the Korean Intellectual Property Office, the disclosure of which is incorporated herein by reference.

BACKGROUND OF THE INVENTION

1. Field of the Invention

The present invention relates to a wearable glass device, and more particularly, to a wearable glass device which can output an image projected from an optical device to the outside, when one of a left temple and a right temple having an optical device is folded.

2. Description of the Related Art

A wearable glass device is a device for outputting images. The wearable glass device may be a device which is equipped with a glass that allows a user to recognize the front view, and displays related information by using a separate display or the like.

Meanwhile, the wearable glass device may be used to provide various user interfaces, and accordingly, various studies have been conducted.

SUMMARY OF THE INVENTION

The present invention has been made in view of the above problems, and provides a wearable glass device which can output an image projected from an optical device to the outside, when one of a left temple and a right temple having an optical device is folded.

The present invention further provides a wearable glass device which can protect the left temple and the right temple, as the left temple and the right temple are folded.

The present invention further provides a wearable glass device which can output an image projected from an optical device to the outside according to the pivoting of the optical device.

The present invention further provides a wearable glass device which can output an image projected from an optical device to the outside according to the pivoting of a prism.

In accordance with an aspect of the present invention, a wearable glass device includes: a left eye glass and a right eye glass; a frame for supporting the left eye glass and the right eye glass; a left hinge and a right hinge connected to the frame and pivotable; a left temple and a right temple connected respectively to the left hinge and the right hinge; and an optical device attached to any one of the left temple and the right temple, wherein an image projected from the optical device is outputted and displayed forward, when any one of the left temple and the right temple to which the optical device is attached is folded, and the image projected from the optical device is displayed on any one of the left eye glass and the right eye glass, when any one of the left temple and the right temple to which the optical device is attached is unfolded.

In accordance with another aspect of the present invention, a wearable glass device includes: a left eye glass and a right eye glass; a frame for supporting the left eye glass and the right eye glass; a left hinge and a right hinge connected to the frame and pivotable; a left temple and a right temple connected respectively to the left hinge and the right hinge; and an optical device attached to any one of the left temple and the right temple, wherein the optical device is disposed in any one of the left temple and the right temple attached thereto, and is pivotable, and an image projected from the optical device is displayed on any one of the left eye glass and the right eye glass, when an optical module in the optical device is located on an inner surface of any one of the left temple and the right temple to which the optical device is attached, in a state in which any one of the left temple and the right temple to which the optical device is attached is unfolded, and the image projected from the optical device is outputted and displayed forward, when the optical module in the optical device is located on an outer surface of any one of the left temple and the right temple to which the optical device is attached, in a state in which any one of the left temple and the right temple to which the optical device is attached is unfolded.

In accordance with another aspect of the present invention, a wearable glass device includes: a left eye glass and a right eye glass; a frame for supporting the left eye glass and the right eye glass; a left hinge and a right hinge connected to the frame and pivotable; a left temple and a right temple connected respectively to the left hinge and the right hinge; an optical device attached to any one of the left temple and the right temple; and a prism pivotably disposed between the optical device and any one of the left eye glass and the right eye glass, and changes a light traveling direction of an image projected from the optical device, wherein the image projected from the optical device is displayed on any one of the left eye glass and the right eye glass, when the prism is located corresponding to an inner surface of any one of the left temple and the right temple to which the optical device is attached, in a state in which any one of the left temple and the right temple to which the optical device is attached is unfolded, and the image projected from the optical device is outputted and displayed forward, when the prism is located corresponding to an outer surface of any one of the left temple and the right temple to which the optical device is attached, in a state in which any one of the left temple and the right temple to which the optical device is attached is unfolded.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE PREFERRED EMBODIMENTS

Exemplary embodiments of the present invention are described with reference to the accompanying drawings in detail. The term "module" used in this specification may mean, for example, a unit including one or a combination of at least two of hardware, software, or firmware. The "module" may be interchangeably used with terms such as a unit, a logic, a logical block, a component, or a circuit. The "module" may be a minimum unit or a part of integrally configured component. The "module" may be a minimum unit or a part for performing one or more functions.

FIG. 1A to FIG. 1G are views showing an appearance of a wearable glass device according to an embodiment of the present invention.

Figure 1A:
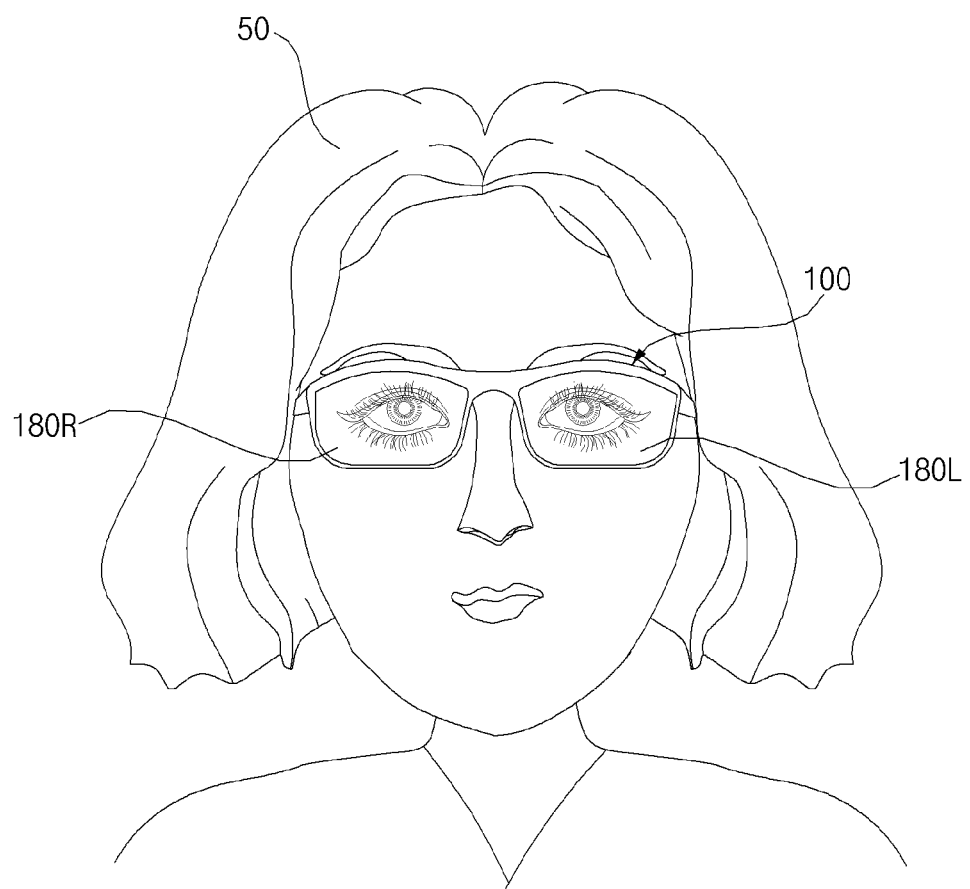
FIG. 1A to FIG. 1G are views showing an appearance of a wearable glass device according to an embodiment of the present invention.
Figure 1B:
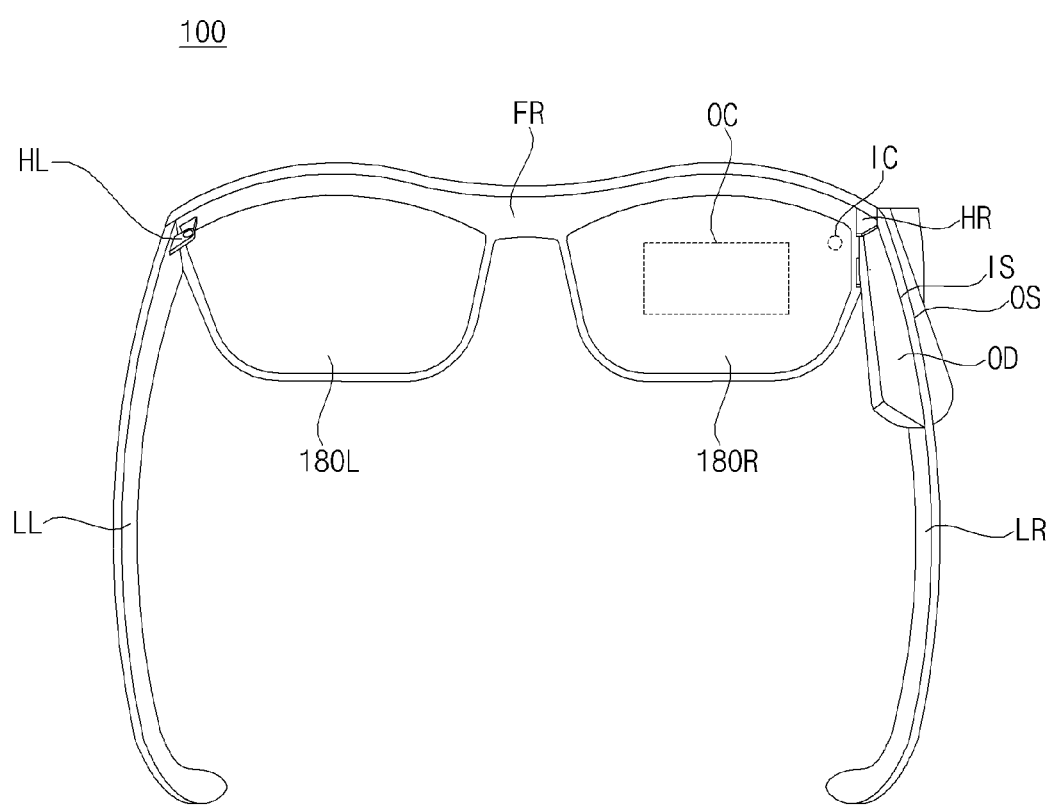
Figure 1C:
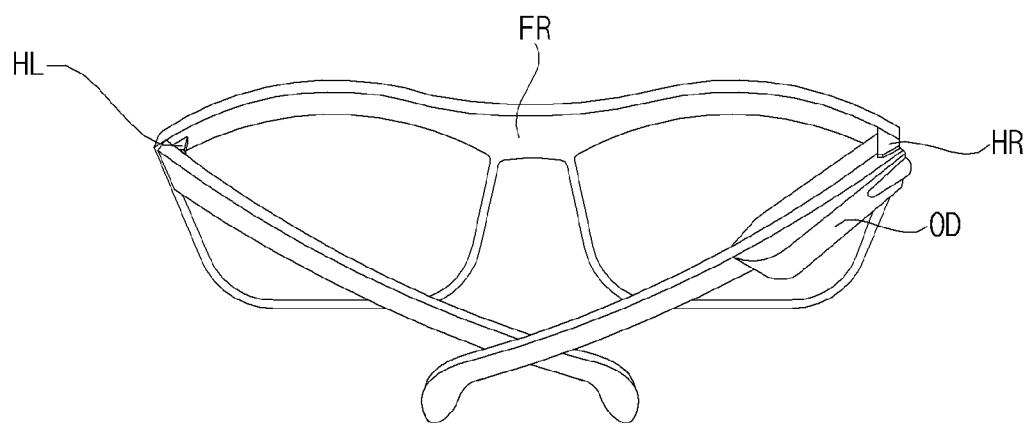

First, FIG. 1A is a view showing a user 50 wearing a wearable glass device 100, and FIG. 1B and FIG. 1C are views showing an inner side of the wearable glass device 100.

Referring to FIG. 1A to FIG. 1C, a wearable glass device 100 according to an embodiment of the present invention may include a left eye glass 180L and a right eye glass 180R, a frame FR for supporting the left eye glass 180L and the right eye glass 180R, a left hinge HL and a right hinge HR connected to the frame FR and are pivotable, a left temple LL and a right temple LR connected respectively to the left hinge HL and the right hinge HR, and an optical device OD attached to either the left temple LL or the right temple LR.

In particular, the drawing illustrate that the optical device OD is attached to the inner surface IS and the outer surface OS of the right temple LR.

The left eye glass 180L and the right eye glass 180R may include a see through lens respectively.

Accordingly, the user 50 wearing the wearable glass device 100 can recognize the front view through the left eye glass 180L and the right eye glass 180R.

Meanwhile, when the optical device OD is attached to the outer surface OS of the right temple LR, the right eye glass 180R of the left eye glass 180L and the right eye glass 180R may be provided with an in-coupling area IC on which a projection image output from the optical device OD is incident and an out-coupling area OC where the projection image is displayed.

Accordingly, the user 50 wearing the wearable glass device 100 can recognize the image displayed in the out-coupling area OC.

At this time, the image displayed in the out-coupling area OC may be a virtual image, and the user 50 wearing the wearable glass device 100 can recognize the virtual image having a focal length formed in front of the wearable glass device 100.

To this end, the out-coupling area OC in the right eye glass 180R may have a structure having a surface structure such that an image is output in the eye direction of the user 50.

For example, the out-coupling area OC in the right eye glass 180R may include Holographic Optical Elements (HOE) where a structure is formed inside Diffractive Optical Elements (DOE) having a grating formed on its surface so as to form volume grating, a beam splitter for splitting a beam, a segmented beam splitter, or the like.

Meanwhile, the left eye glass 180L and the right eye glass 180R may be coupled and fixed to the frame FR. In the drawing, it is illustrated that the frame FR surrounds the left eye glass 180L and the right eye glass 180R, but it is sufficient that it surrounds and supports only part of them.

Meanwhile, the left hinge HL and the right hinge HR may be formed at the left and right ends of the frame FR, respectively.

The left temple LL and the right temple LR may be unfolded or folded respectively by the pivoting of the left hinge HL and the right hinge HR. For example, the pivot angle of the left hinge HL and the right hinge HR may be approximately 0 to 120 degrees so that the left temple LL and the right temple LR can be unfolded or folded respectively.

Meanwhile, FIG. 1B illustrates a case where the left temple LL and the right temple LR are unfolded, and FIG. 1C illustrates that the left temple LL and the right temple LR are folded.

Meanwhile, in the embodiment of the present invention, when the right temple LR, among the left temple LL and the right temple LR, to which the optical device OD is attached is unfolded as shown in FIG. 1B, as a personal mode, the image projected from the optical device OD may be incident on the in-coupling area IC in the right eye glass 180R and displayed in the out-coupling area OC in the right eye glass 180R.

As described above, when the right temple LR to which the optical device OD is attached is unfolded, an image projected from the optical device OD can be displayed in the out-coupling area OC in the right eye glass 180R, so that, as a personal mode, the user 50 may recognize and watch the image.

Meanwhile, in the embodiment of the present invention, when the right temple LR to which the optical device OD is attached is unfolded as shown in FIG. 1C, as a common mode, the image projected from the optical device OD may be output frontward and displayed.

As described above, when the right temple LR to which the optical device OD is attached is folded, the image projected from the optical device OD can be output to the outside, so that, as a common mode, the user can watch the image projected from the optical device OD along with the surrounding people.

Meanwhile, as the left temple LL and the right temple LR are folded, the left temple LL and the right temple LR can be prevented from being damaged, and eventually, the left temple LL and the right temple LR can be protected.

Figure 1D:
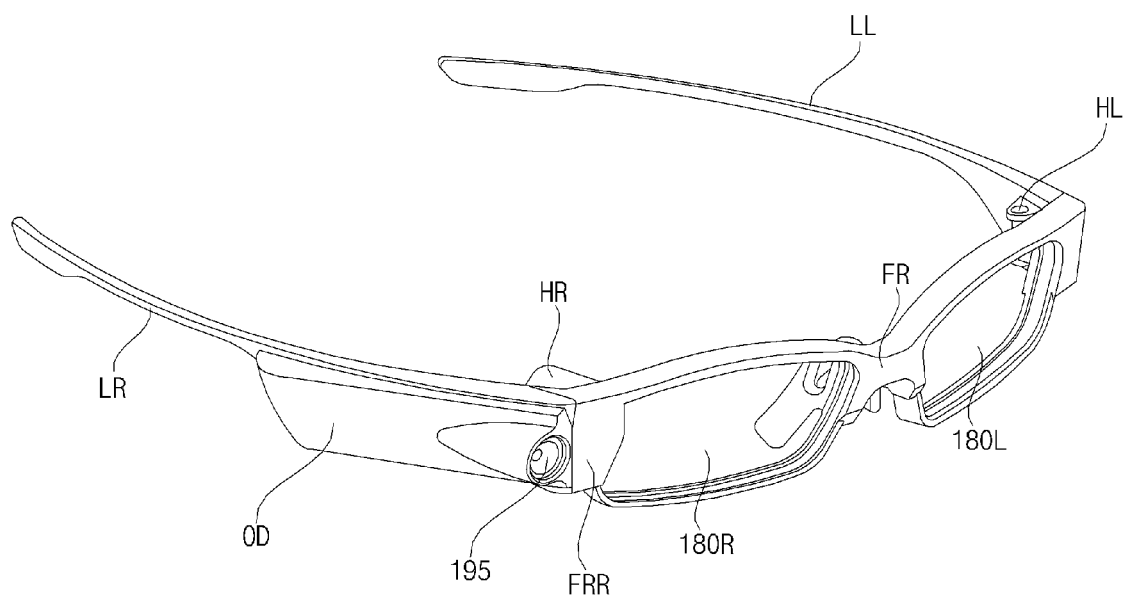
Figure 1E:
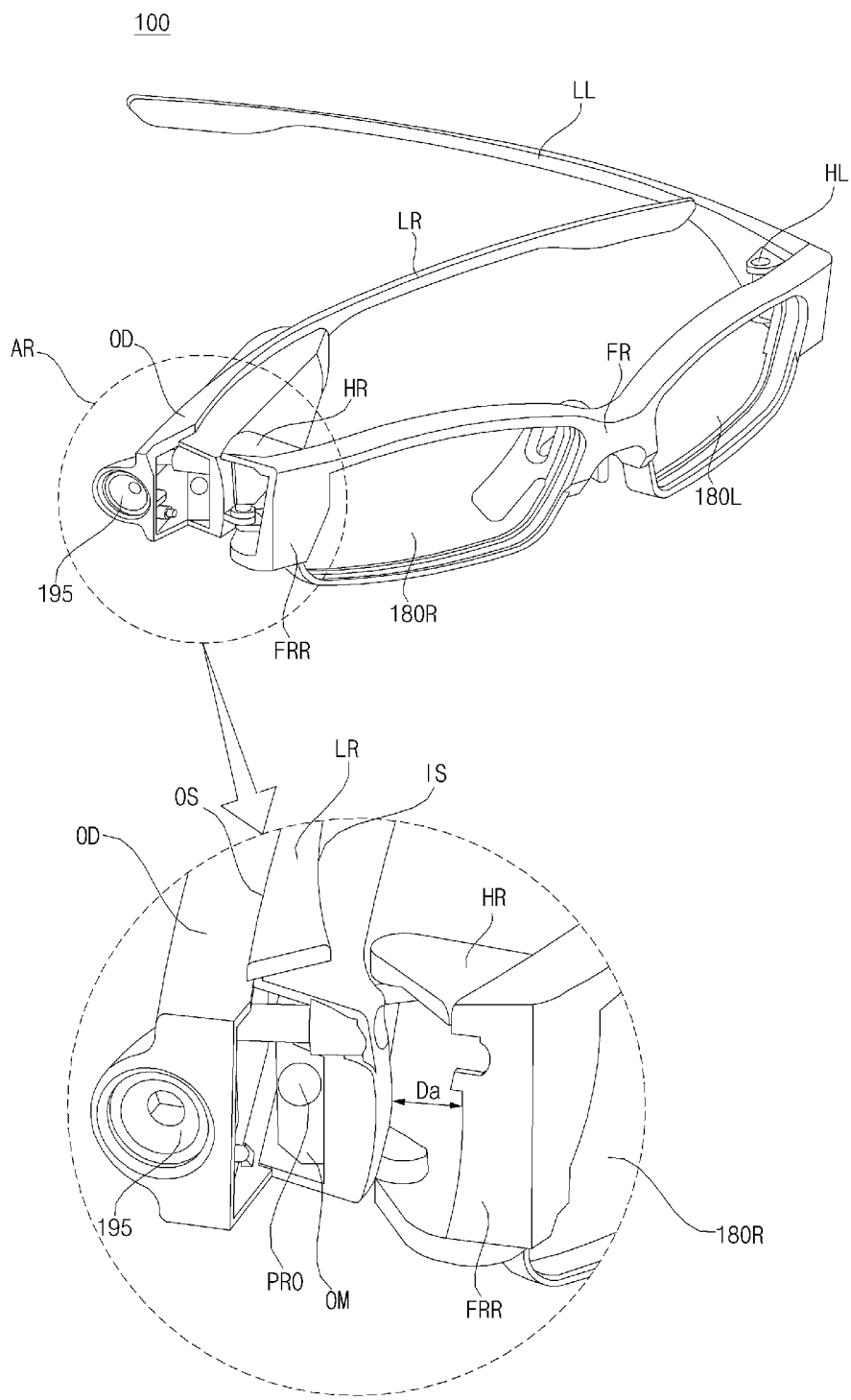

FIG. 1D and FIG. 1E are views of the wearable glass device 100 viewed from the outer side.

FIG. 1D shows a state in which the left temple LL and the right temple LR are unfolded.

As shown in the drawing, when the right temple LR is unfolded in a state in which the optical device OD is attached to the right temple LR, an image output unit PRO of the optical device OD may not be exposed as it is covered by the right hinge HR or a right frame FRR, but the lens of a camera 195 may be exposed.

Thus, when the right temple LR is unfolded, the image projected from the optical device OD can be displayed in the out-coupling area OC in the right eye glass 180R, so that, as a personal mode, the user 50 can recognize and watch a corresponding image.

FIG. 1E shows a state in which the left temple LL and the right temple LR are folded.

As shown in the drawing, when the right temple LR is folded in a state in which the optical device OD is attached to the right temple LR, the image output unit PRO of the optical device OD may be exposed without being covered by the right hinge HR or the right frame FRR, and the lens of the camera 195 may also be exposed.

Accordingly, when the right temple LR is folded, the image projected from the optical device OD may be outputted to the outside, so that, as a common mode, the image projected from the optical device OD can be viewed by a user and, furthermore, by others around the user.

Meanwhile, since the right temple LR is folded or unfolded, in order to prevent wear, damage, and the like of the image output unit PRO which is the end of the optical device OD, it is preferable that the right hinge (HR) or the right frame (FRR) and the image output unit PRO are spaced apart from each other by a certain distance or more.

In the drawing, it is illustrated that the right temple LR is coupled to both ends of the right hinge HR so that a distance between the right temple LR and the right frame FRR is Da. This makes it possible to prevent wear, damage, and the like of the image output unit PRO which is the end of the optical device OD.

Figure 1F:
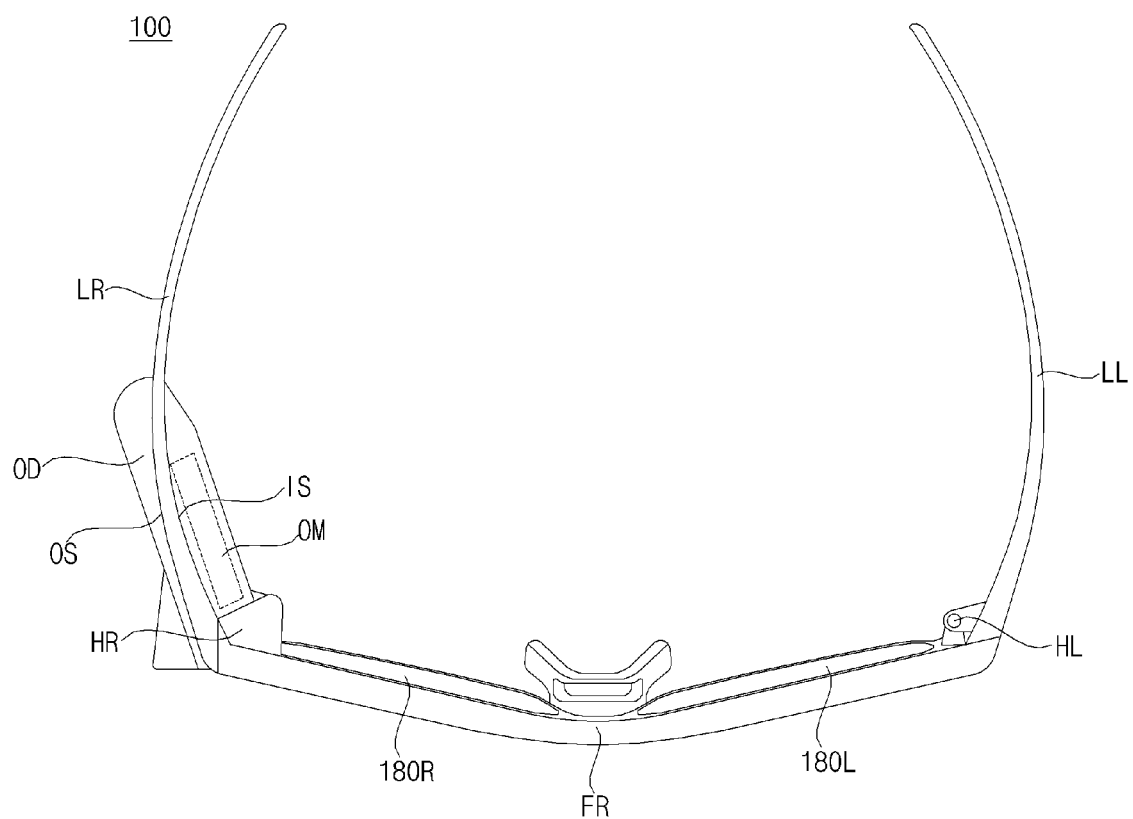
Figure 1G:
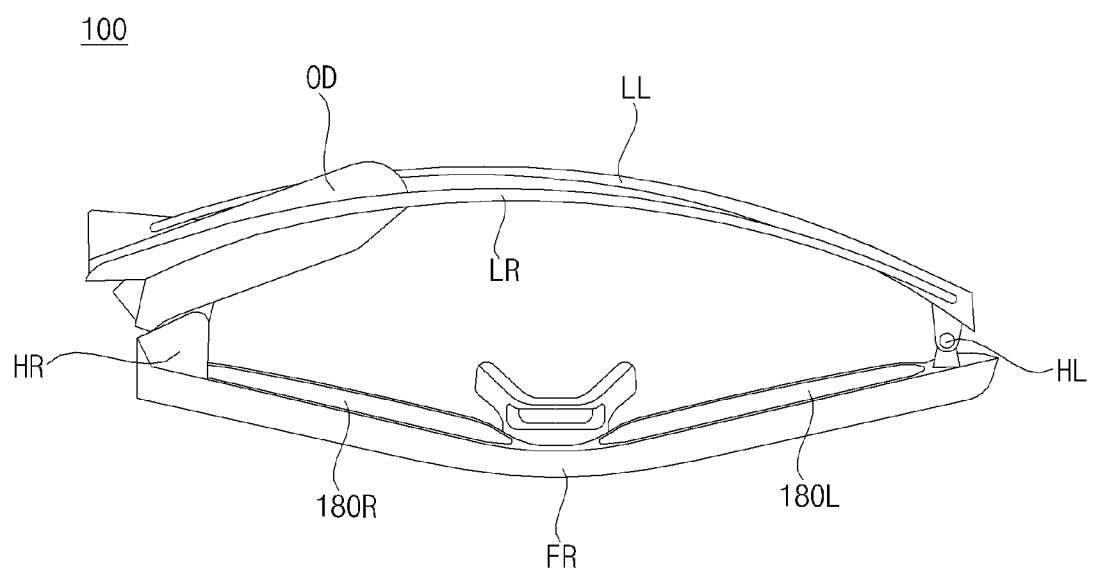

FIG. 1F and FIG. 1G are views of the wearable glass device 100 viewed from above.

FIG. 1F shows a state in which the left temple LL and the right temple LR are opened, and FIG. 1E shows a state in which the left temple LL and the right temple LR are folded.

As described above, since the right temple LR and the left temple LL having the optical device OD are unfolded or folded, it is possible to perform a personal mode or a common mode. Further, the left temple LL and the right temple LR can be prevented from being damaged, and eventually, the left temple LL and the right temple LR can be protected. Therefore, the durability of the wearable glass device 100 can be improved.

Figure 2:
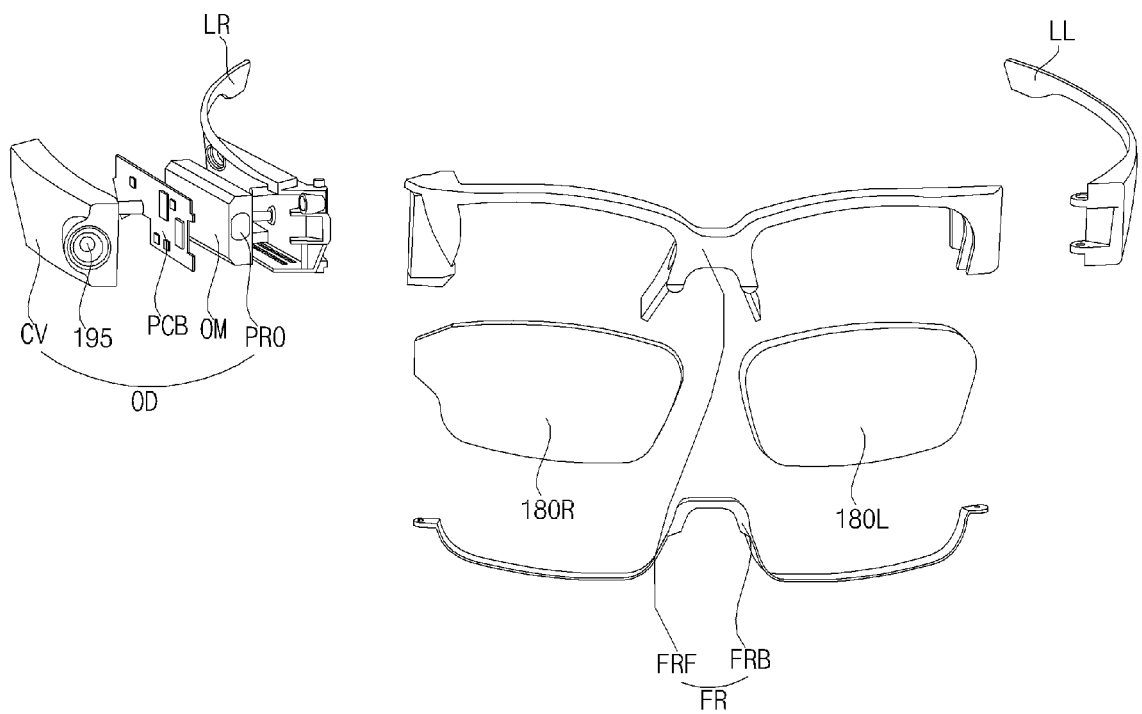
FIG. 2 is an exploded view of a wearable glass device according to an embodiment of the present invention.

FIG. 2 is an exploded view of a wearable glass device according to an embodiment of the present invention.

Referring to the drawing, a wearable glass device 100 according to an embodiment of the present invention may include a left eye glass 180L and a right eye glass 180R, a frame FR for supporting the left eye glass 180L and the right eye glass 180R, a left hinge HL and a right hinge HR connected to the frame FR and are pivotable, a left temple LL and a right temple LR connected to the left hinge HL and the right hinge HR, and an optical device OD attached to either the left temple LL or the right temple LR.

Particularly, the frame FR may include an upper frame FRF for supporting the upper side of the left eye glass 180L and the right glass 180R, and a lower frame FRB for supporting the lower side of the left eye glass 180L and the right eye glass 180R.

Meanwhile, as shown, the optical device OD may include an optical module (OM) attached to the optical device OD, a printed circuit board (PCB) mounted on the optical module OM, and a cover CV covering the printed circuit board.

Meanwhile, a lens of the camera 195 may be attached to the cover (CV).

Figure 3:
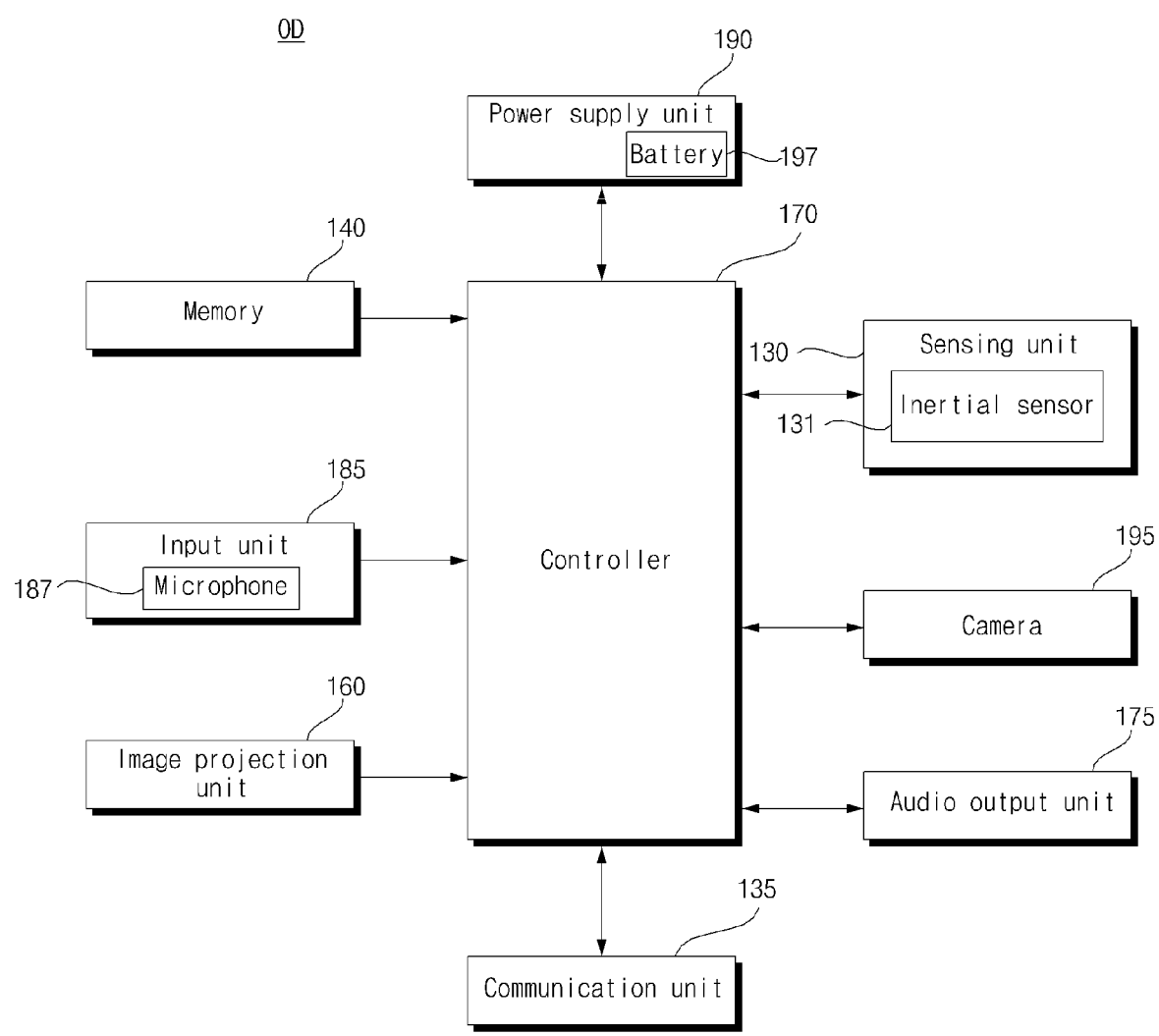
FIG. 3 is an internal block diagram of an optical device of FIG. 2.

Meanwhile, in the printed circuit board, a controller 170, a memory 140, a power supply unit 190, an input unit 185, a communication unit 135, an audio output unit 175, a camera 195, a circuit element in an image projection unit 160, a sensing unit 130, and the like of FIG. 3 may be disposed.

Here, the circuit element in the image projection unit 160 may include a light source unit 210R, 210G, 210B, 210IR, a scanner 240, a light detector 280, a processor 270, and the like.

Meanwhile, the optical module OM may have an optical structure for outputting a projection image. For example, it may have an optical element in the image projection unit 160.

More specifically, the optical module OM may include a collimator lens in a light collector 212, a 2D MEMS mirror in the light synthesis unit 220, a polarization separating unit 281, a light reflecting unit 256, and a polarization conversion unit (not shown).

FIG. 3 is an internal block diagram of an optical device of FIG. 2.

Referring to the drawing, the optical device (OD) in the wearable glass device 100 may include a sensing unit 130, a communication unit 135, a memory 140, an image projection unit 160, an audio output unit 175, a controller 170, an input unit 185, a power supply unit 190, and a camera 195.

When these components are implemented in an actual application, if necessary, two or more components may be combined into a single component, or a single component may be divided into two or more components.

The sensing unit 130 may include an inertial sensor 131. The inertial sensor may include an acceleration sensor, a gyro sensor, a gravity sensor, and the like. For example, the acceleration sensor, the gyro sensor, the gravity sensor, and the like may be equipped with a six-axis sensor.

The sensing unit 130 may output motion information of the wearable glass device 100, for example, movement information (acceleration information, angular velocity information) or position information based on x, y, and z axes.

Meanwhile, the sensing unit 130 may include a sensor for obtaining user body information. For example, it may include a blood pressure sensor, an electroencephalogram sensor, or the like.

Meanwhile, the communication unit 135 may provide an interface for communication with an external device. To this end, the communication unit 135 may include at least one of a mobile communication module (not shown), a wireless Internet module (not shown), a short distance communication module (not shown), and a GPS module (not shown).

For example, the communication unit 135 may perform IR communication, Bluetooth communication, WiFi communication, or the like, thereby exchanging data with a paired mobile terminal 600 or a home appliance, or transmitting data. In particular, a video signal or an audio signal may be received from the paired mobile terminal 600.

The memory 140 may store a program for processing or controlling the controller 170 in the wearable glass device 100, or may serve to temporarily store input or output data.

The audio output unit 175 may output a processed audio signal from the controller 170 in the wearable glass device 100.

Alternatively, the audio output unit 175 may output guide information related to the operation of the wearable glass device 100 as an audio signal.

The controller 170 may control the overall operation of the wearable glass device 100 by controlling the operation of each unit in the wearable glass device 100.

Meanwhile, the controller 170 may perform signal processing for an audio signal received from the outside.

Meanwhile, the input unit 185 may include a button for initializing the wearable glass device 100, inputting an operation, or the like.

Meanwhile, the input unit 185 may include a microphone 187 for sound collection.

The power supply unit 190 may supply power necessary for the operation of each component, under the control of the controller 170.

In particular, the power supply unit 190 may include a battery 197 that stores and outputs a DC power.

The image projection unit 160 may output the projection image to the outside. This will be described later with reference to FIGS. 4A to 4C.

The camera 195 may obtain an image based on visible light or an image based on infrared ray. The image obtained by the camera 195 may be image-processed in the controller 170.

Meanwhile, the camera 195 may be a visible light camera based on visible light or an infrared camera based on infrared ray.

Meanwhile, the camera 195 may be attached to either the left temple LL or the right temple LR, and may photograph the front of the wearable glass device 100.

The controller 170 may control the focal point of the image projected to the outside to be varied, according to a distance to an external object calculated by the image projection unit 160, particularly, by the processor 270.

For example, the controller 170 may control the image projection unit 160 in such a manner that the focus of the image projected to the outside is formed in a farther location as the distance to an external object is increased.

Meanwhile, based on a sensing signal of the inertial sensor 131, the controller 170 may determine whether any one of the left temple LL and the right temple LR to which the optical device OD is attached is folded or unfolded.

For example, when the folded right temple LR is unfolded due to a right pivoting, the controller 170 may recognize that the right temple LR is unfolded, by using the increase in the angular velocity of the inertial sensor 131 in the right direction.

For another example, when the unfolded right temple LR is folded due to a left pivoting, the controller 170 may recognize that the right temple LR is folded, by using the increase in the angular velocity of the inertial sensor 131 in the left direction.

Meanwhile, depending on whether the right temple LR to which the optical device OD is attached is folded or unfolded, the controller 170 may control at least one of resolution, luminance, and brightness of the image output from the image projection unit 160 to be varied.

For example, since operation should be performed as a common mode when the right temple LR to which the optical device OD is attached is folded rather than being unfolded, the controller 170 may control at least one of resolution, luminance, and brightness output from the image projection unit 160 to be larger. Accordingly, an image projection suitable for the common mode can be achieved.

In addition, since operation should be performed as a common mode when the right temple LR to which the optical device OD is attached is folded rather than being unfolded, the controller 170 may control the focal length of the image output from the image projection unit 160 to be more increased.

Meanwhile, since operation should be performed as a personal mode when the right temple LR to which the optical device OD is attached is unfolded rather than being folded, the controller 170 may control at least one of resolution, luminance, and brightness output from the image projection unit 160 to be smaller. Accordingly, an image projection suitable for the personal mode can be achieved.

In addition, since operation should be performed as a personal mode when the right temple LR to which the optical device OD is attached is unfolded rather than being folded, the controller 170 may control the focal length of the image output from the image projection unit 160 to be more decreased.

Meanwhile, the controller 170 may calculate the distance to the external object based on the image from the camera 195, and control the focus of the image projected to the outside according to the distance calculated for the external object.

For example, when the camera 195 is an infrared camera, the controller 170 may extract depth information from the image from the infrared camera, and calculate the distance to the external object, depending on a depth. In addition, the controller 170 may control the focal length of the image to be more increased, as the depth or the distance is increased.

For another example, when the camera 195 is a visible light-based camera, the controller 170 may detect an object in an image from the camera, calculate a disparity for the object based on the sequentially obtained image, and may calculate the distance to the external object, based on the calculated disparity. In addition, the controller 170 may control the focal length of the image to be increased, as the depth or the distance is increased.

Meanwhile, when the right temple LR to which the optical device OD is attached is unfolded, the image obtained by the camera 195 may include a part of the right frame FRR out of the frame FR. Accordingly, the controller 170 may recognize that the right temple LR to which the optical device OD is attached is unfolded, when a part of the right frame FRR of the frame FR is included in the obtained image.

Meanwhile, when the right temple LR to which the optical device OD is attached is folded, the image obtained by the camera 195 may not contain the frame FR at all. Accordingly, the controller 170 may recognize that the right temple LR to which the optical device OD is attached is folded, when no frame FR is contained in the obtained image.

In addition, depending on whether the right temple LR to which the optical device OD is attached is folded or unfolded, based on the image obtained by the camera 195, the controller 170 may vary at least one of resolution, luminance, and brightness of the image output from the image projection unit 160.

Figure 4A:
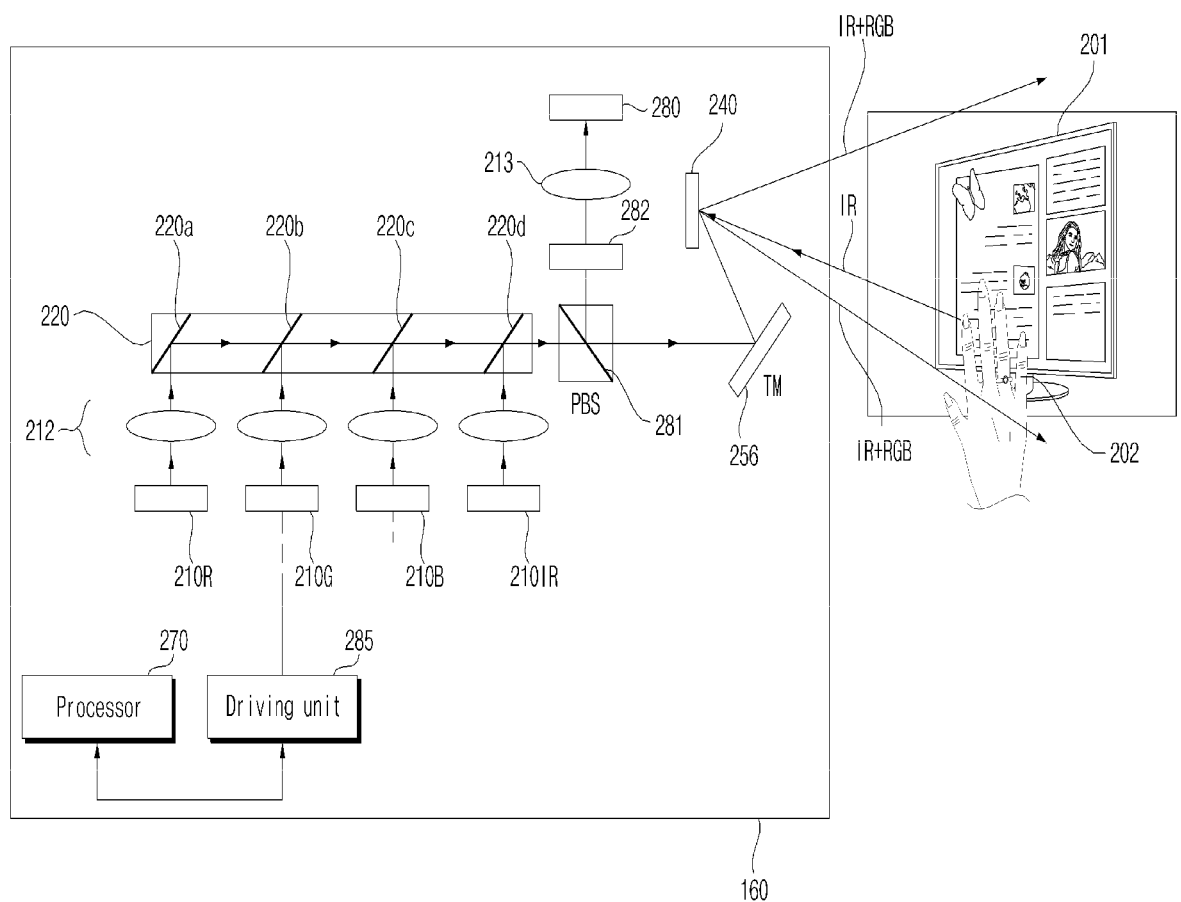
FIG. 4A to FIG. 4C are views for explaining an image projection unit of FIG. 3.
Figure 4B:
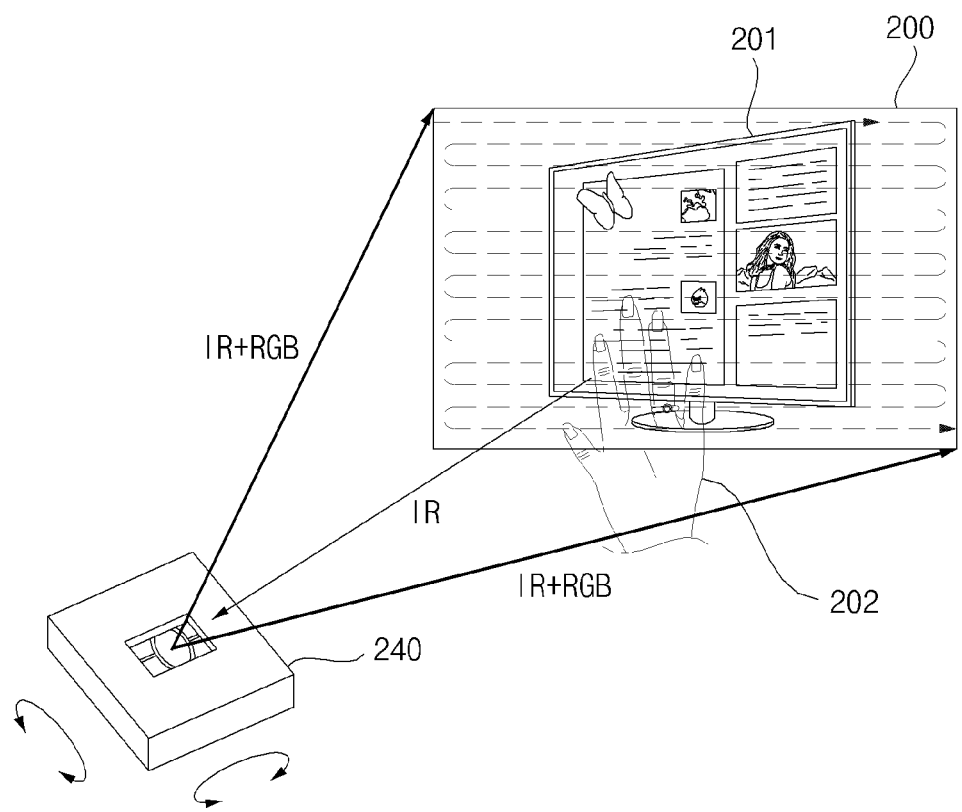
Figure 4C:
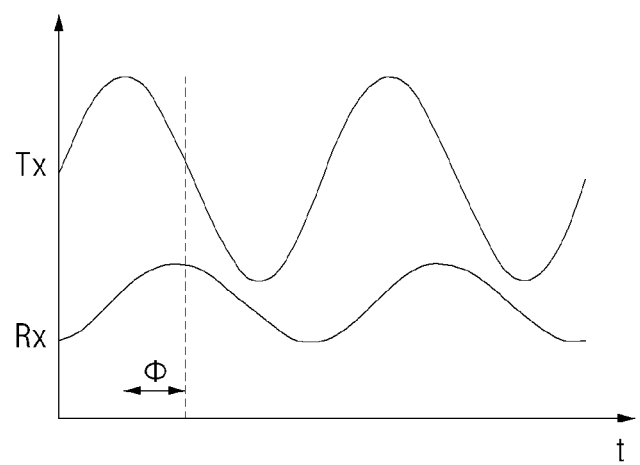

FIG. 4A to FIG. 4C are views for explaining an image projection unit of FIG. 3.

First, FIG. 4A is a view showing an example of the internal structure of the image projection unit 160 of FIG. 3.

Referring to the drawing, the image projection unit 160 may output visible light (RGB).

Meanwhile, as shown in the drawing, the image projection unit 160 may output both visible light (RGB) and infrared ray (IR). Hereinafter, the output of both visible light (RGB) and infrared ray (IR) will be mainly described.

Referring to FIG. 4A, the image projection unit 160 may include a plurality of light sources. That is, it may include a red light source unit 210R, a green light source unit 210G, a blue light source unit 210B, and an output light source unit 210IR for outputting an output light of infrared ray type. Among these, the light source units 210R, 210G, and 210B may include a laser diode.

Meanwhile, respective light sources 210R, 210G, 210B and 210IR may be driven by each electric signal from a driving unit 285. The electric signal of the driving unit 285 may be generated due to a control of the processor 270. In particular, the output light source unit 210IR may output an output light due to a first electric signal.

The lights output from each light source unit 210R, 210G, 210B, and 210IR may be collimated through each collimator lens in the light collector 212.

The light synthesis unit 220 may synthesize the lights output from each light source unit 210R, 210G, 210B, and 210IR, and output the synthesized light in one direction. To this end, the light synthesis unit 220 may include four 2D MEMS mirrors 220a, 220b, 220c, and 220d.

That is, a first light synthesis unit 220a may receive a red light output from the red light source unit 210R, change a light traveling direction, and output the red light in the direction of the scanner 240.

Next, a second light synthesis unit 220b may receive a green light output from the green light source unit 210G, change a light traveling direction, and output the green light in the direction of the scanner 240. Meanwhile, the second light synthesis unit 224 may output the red light from the red light source unit 210R in the direction of the scanner 240 intactly, without changing an optical path.

In this manner, a third light synthesis unit 220c and a fourth light synthesis unit 220d may output a blue light and an output light in the direction of the scanner 240, respectively.

Next, the red light, the green light, the blue light, and the output light passing through the light synthesis unit 210 may pass through the polarization separation part 281.

The polarization separating unit 281 may transmit the red light, green light, and blue light that are visible light intactly, transmit some polarization of the output light La, and radiate other polarization.

For example, in the case of an output light of a P polarization state among the output lights, the polarization separating unit 281 may transmit the output light, and transfer the output light of the P polarization state in the direction of the scanner 240. Meanwhile, the polarization separating unit 281 may reflect a reception light of a S polarization state among the reflected lights, and transfer the reception light of the S polarization in the direction of the light detector 280. This polarization separating unit may be called a polarizer beam splitter (PBS).

The light reflecting unit 256 may reflect the red light, the green light, the blue light and the output light which passed through the polarization separating unit 281 in the direction of the scanner 240, and reflect the reception light received through the scanner 240 in the direction of the polarization separating unit 281. The light reflecting unit 256 can reflect light of various wavelengths, not only the wavelength of the output light. Accordingly, the light reflecting unit 256 may be provided with a total mirror (TM).

Meanwhile, although not shown in the drawing, a polarization conversion unit (not shown) may be provided between the light reflecting unit 256 and the polarization separating unit 281.

The polarization conversion unit (not shown) may convert the polarization direction of the output light, and convert the polarization direction of the reception light.

For example, the polarization conversion unit (not shown) may control the polarization direction by giving a phase difference. In particular, it is possible to convert linear polarization into circular polarization or circular polarization into linear polarization.

Specifically, the polarization conversion unit (not shown) may convert the output light of P polarization into the output light of circular polarization. Accordingly, the scanner 240 may output the output light of circular polarization to the outside, and receive a reception light of circular polarization from the outside. Meanwhile, the polarization conversion unit (not shown) may convert a reception light of circular polarization received through the scanner 240 into a reception light of S polarization. Accordingly, the polarization conversion unit (not shown) may be called a quarter wavelength plate (QWP).

For another example, the polarization conversion unit (not shown) may output the output light of P polarization intactly, and convert a reception light of P polarization received from the scanner 240 into a reception light of S polarization.

Meanwhile, in the image projection unit 160 of FIG. 4A, the optical path of the output light and the optical path of the reception light Lb may be partially overlapped. As described above, the image projection unit 160 having a structure in which the optical path of optical output and the optical path of optical reception are partially overlapped may be called a coaxial optical system. The image projection unit 160 having such a structure may be miniaturized, well-protected against external light, and have a high signal-to-noise ratio.

Meanwhile, it is also possible that the optical path of the output light and the optical path of the reception light are completely separated from each other. As described above, the image projection unit 160 having a structure in which the optical path of optical output and the optical path of optical reception are completely separated from each other may be called a separated optical system.

Meanwhile, the scanner 240 may receive the output light from the light source unit 210, and may perform, sequentially and repeatedly, a first direction scanning and a second direction scanning to the outside. Such a scanning operation may be repeatedly performed for the whole of an external scan area.

The reception light which is scattered or reflected based on the output light may be transmitted in the direction of the light detector 280 different from the optical path of the output light via the 2D scanner 240, the light reflecting unit 256, and the polarization separating unit 281. Then, the reception light may be input to the light detector 280 via an infrared ray transmitting filter 282 and a light collector 213 for a reception light.

The light detector 280 may convert the reception light received from the outside into a second electric signal in response to the output light. To this end, the light detector 280 may include a photodiode that converts an optical signal into a reception signal, i.e., an electric signal. In particular, the light detector 280 may include an avalanche photodiode that converts a weak reception light scattered from the external object 240 into an electric signal by using a photodiode having high photoelectric efficiency.

Meanwhile, although not shown in the drawing, a sampler (not shown) for converting an analog signal into a digital signal may be further provided between the light detector 280 and the processor 270.

The processor 270 may detect a distance to an external object located in the external scan area, by using a phase difference between the first electric signal corresponding to the output light and the second electric signal corresponding to the reception light.

FIG. 4B is a view illustrating an operation of the scanner in the image projection unit 160 of FIG. 3.

Referring to the drawings, the scanner 240 according to an embodiment of the present invention may perform the first direction scanning and the second direction scanning sequentially and repeatedly with respect to the input light, and output to an external area 200.

Meanwhile, when the image projection unit 160 outputs both visible light and infrared ray, the scanner 240 may simultaneously output the inputted visible light RGB and the output light IR which is infrared ray. Particularly, it is possible to perform scanning for the entire external scan area 200 on a frame-by-frame basis, while performing left-to-right scanning and right-to-left scanning sequentially and repetitively, with respect to the external scan area 200.

In the figure, it is illustrated that a projection image 201 containing a monitor image is displayed in the external scan area 200, based on visible light (RGB), and when a user's hand 202 is located with respect to the projection image 201, the distance detection of the user's hand 202 may be performed by the output light IR which is infrared ray.

That is, according to the wearable glass device 100 of the present invention, since the distance of the external object can be detected while projecting the image to the outside, related image may be displayed based on the distance or movement of the object. Therefore, the user-friendliness may be increased.

Particularly, by detecting an user gesture through a distance detection method and displaying image corresponding to the user gesture, the user-friendliness may be increased.

FIG. 4C is a view for explaining a distance detection method of the image projection unit of FIG. 4A.

Here, Tx represents a phase signal of the output light, and Rx represents a phase signal of the reception light.

Referring to the drawing, the processor (270 of FIG. 4A) of the image projection unit 160 may calculate distance information level, according to a phase difference($\Phi$) between the phase signal of the output light and the phase signal of the reception light.

For example, since the external object exists farther away as the phase difference becomes larger, the distance information level may be set to be larger. In addition, since the external object exists closer as the phase difference becomes smaller, the distance information level may be set to be smaller.

As described above, such a distance level setting may be performed for each area in the external scan area 200, while the external scan area 200 is horizontally scanned and vertically scanned. Meanwhile, the distance information level may be detected for each area of the external scan area 200.

Meanwhile, the processor (270 of FIG. 4A) of the image projection unit may calculate distance information by a phase difference between the electric signal for the output light and the electric signal for the reception light.

Figure 5A:
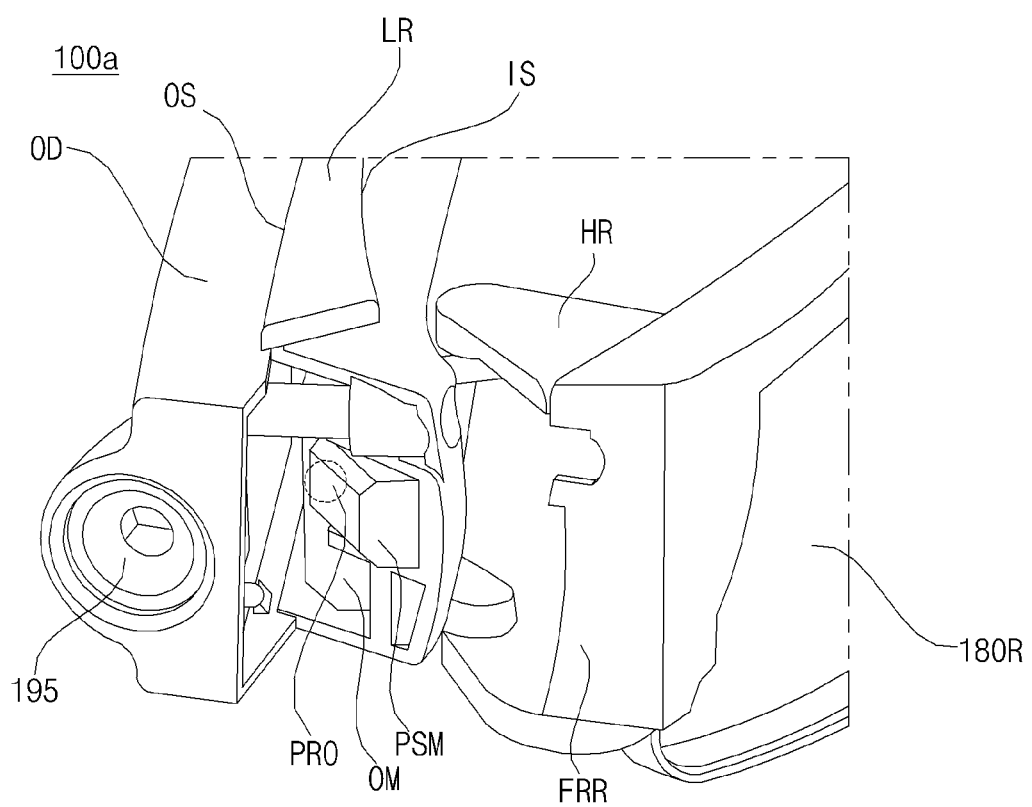
FIG. 5A and FIG. 5B are views showing an appearance of a wearable glass device according to an embodiment of the present invention.
Figure 5B:
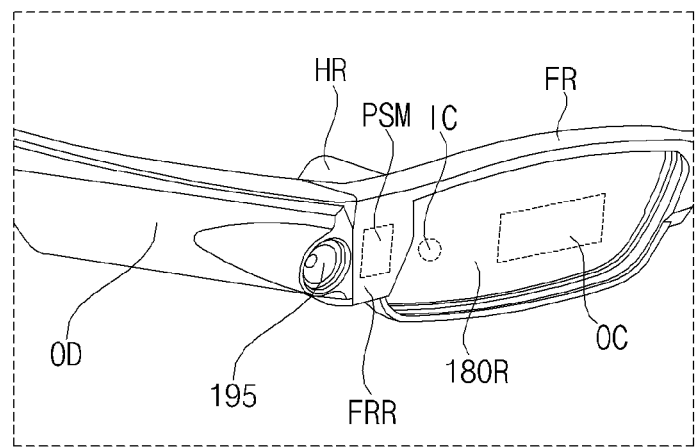

FIG. 5A and FIG. 5B are views showing an appearance of a wearable glass device according to an embodiment of the present invention.

First, referring to FIG. 5A, the wearable glass device 100a may further include a prism PSM which is disposed between the optical device OD and the right eye glass 180R, and changes the light traveling direction of the image projected from the optical device OD.

As shown in FIG. 5A, when the right temple LR is folded, the disposition of the prism PSM may be more clearly checked.

In the drawing, the prism PSM may be disposed between the image output unit PRO of the optical device OD and the right frame FRR. In detail, the prism PSM may be disposed between the image output unit PRO and the right frame FRR, in the end of the optical device OD.

As shown in FIG. 5A, when the right temple LR is folded, the image output from the image output unit PRO of the optical device OD may be projected to the outside, after passing through the prism PSM.

Next, FIG. 5B illustrates a case where the right temple LR is unfolded.

Thus, the image output from the image output unit PRO of the optical device OD may pass through the prism PSM, enter the in-coupling area IC, and may be displayed in the out-coupling area OC in the right eye glass 180R.

Figure 6A:
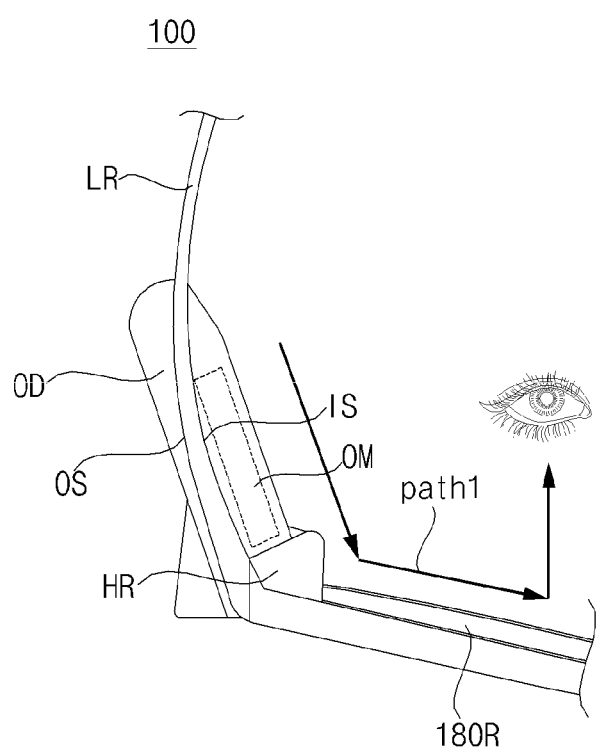
FIG. 6A and FIG. 6B are views showing a movement path of a projection image according to a prism.
Figure 6B:
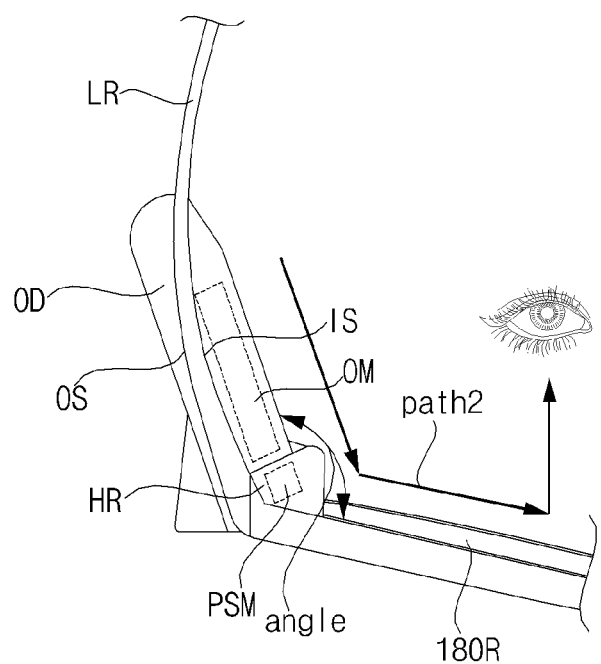

FIG. 6A and FIG. 6B are views showing a movement path of a projection image according to a prism.

First, the wearable glass device 100 of FIG. 6A illustrates a case where a prism PSM is not disposed, similarly to FIGS. 1A to 1G.

According to this, as shown in the drawing, the projection image output from the optical device OD may be recognized through the right eye of the user 50 via the right eye glass 180R, along a first path (path 1).

Next, the wearable glass device 100a of FIG. 6B illustrates a case where the prism PSM is disposed, as shown in FIG. 5A to FIG. 5B.

According to this, as shown in the drawing, the projection image output from the optical device OD may be recognized through the right eye of the user 50 via the prism PSM and the right eye glass 180R, along a second path (path 2). Particularly, the definition of the image and the like displayed on the right eye glass 180R may be improved by the prism PSM.

Meanwhile, the incident angle of the projection image may be adjusted according to the angle of unfolding of the right temple LR. Accordingly, the resolution, the brightness, or the display position of the image recognized by the right eye of the user 50 via the right eye glass 180R may be varied. Thus, the degree of freedom in designing the wearable glass device 100a may be improved.

Meanwhile, unlike FIG. 6B, the prism PSM may be disposed between the image output unit PRO and the right frame FRR, but may be fixed to the right frame FRR.

In this case, in the wearable glass device 100a, when the right temple LR is folded, the image projected from the optical device OD may not be incident on the prism PSM.

Meanwhile, in the wearable glass device 100a, when the right temple LR is unfolded, the image projected from the optical device OD may be displayed on the right eye glass 180R via the prism PSM.

Figure 7A:
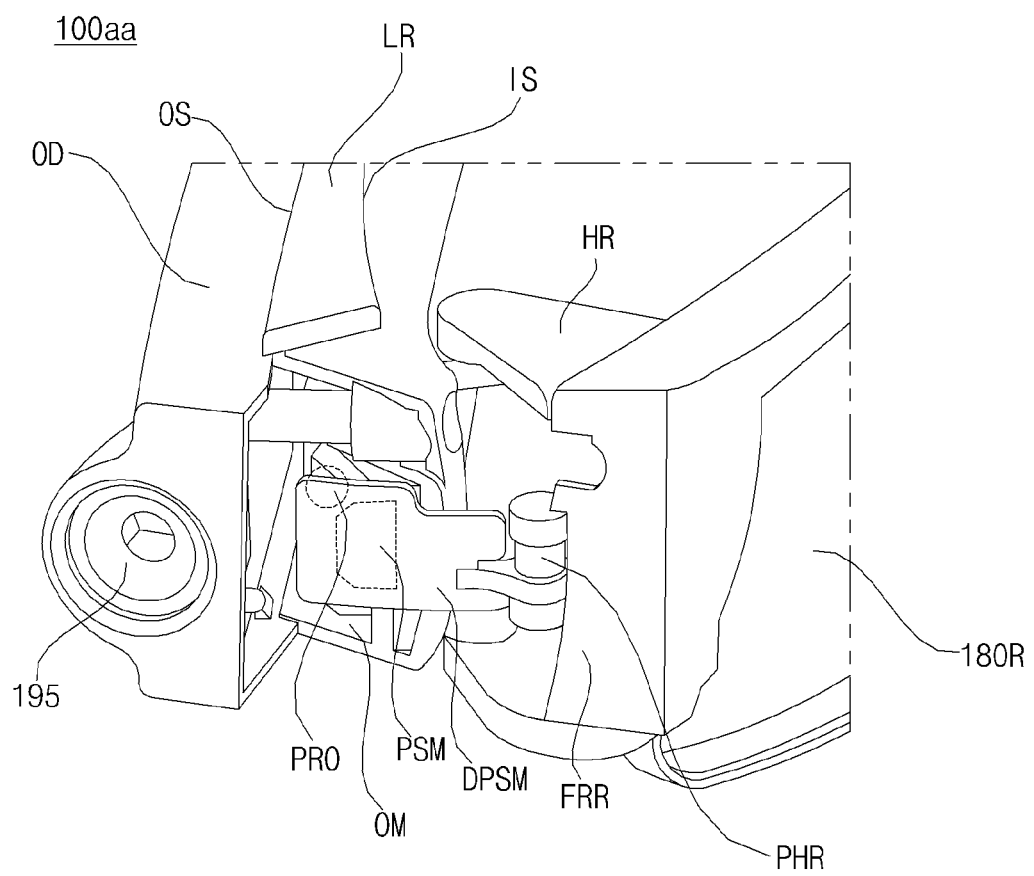
FIG. 7A and FIG. 7B are views showing an appearance of a wearable glass device according to another embodiment of the present invention.
Figure 7B:
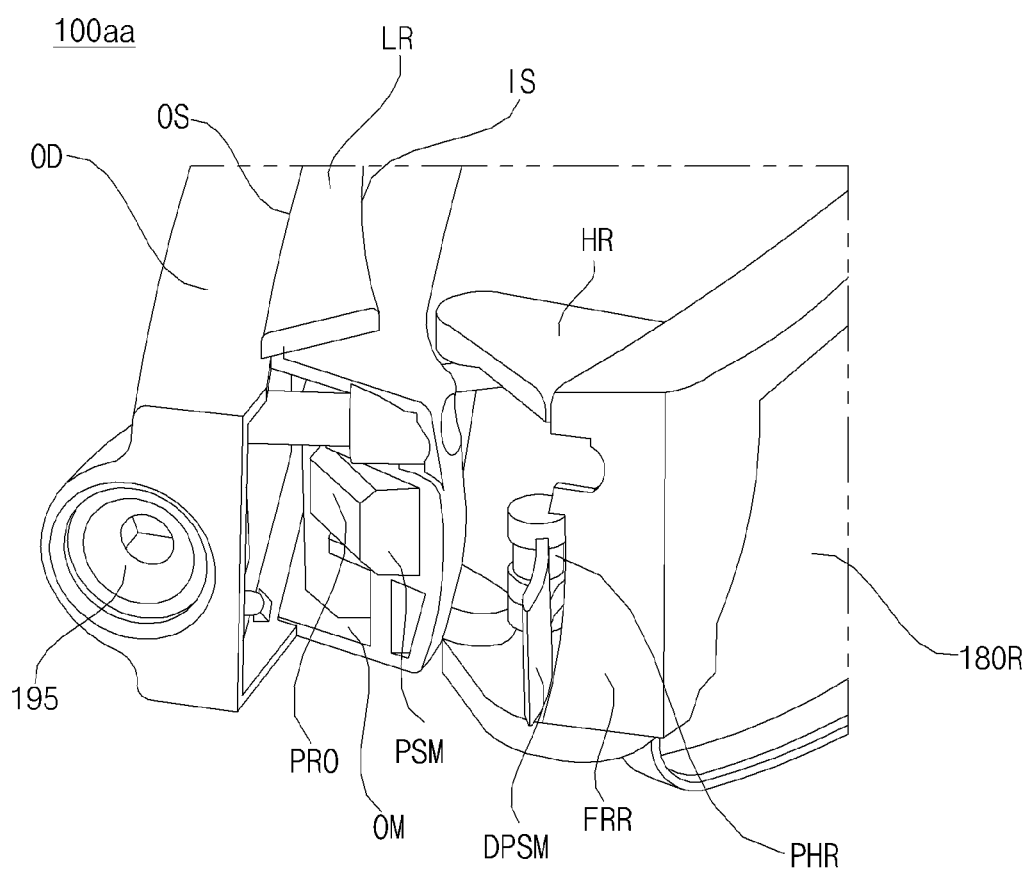

FIG. 7A and FIG. 7B are views showing an appearance of a wearable glass device according to another embodiment of the present invention.

Referring to the drawing, a wearable glass device 100aa according to another embodiment of the present invention may include, similarly to FIG. 1B, a left eye glass 180L and a right eye glass 180R, a frame FR for supporting the left eye glass 180L and the right eye glass 180R, a left hinge HL and a right hinge HR connected to the frame FR and are pivotable, a left temple LL and a right temple LR connected respectively to the left hinge HL and the right hinge HR, and an optical device OD attached to the right temple LR.

Meanwhile, unlike FIG. 1B, the wearable glass device 100aa according to another embodiment of the present invention has a difference in that a prism PSM and a prism cover DPSM are further provided.

The prism PSM may be disposed between the optical device OD and the right eye glass 180R, and may change the light traveling direction of the image projected from the optical device OD.

Meanwhile, the prism cover DPSM may be disposed between the prism PSM and the frame FR, and may be connected to a prism hinge PHR to be pivotable. In particular, it may be disposed between the prism PSM and the right frame FRR, and may be connected to the prism hinge PHR to be pivotable.

FIG. 7A illustrates that the prism cover DPSM is closed to protect the prism PSM in a state where the right temple LR is folded.

Accordingly, the image output from the image output unit PRO of the optical device OD may pass through the prism PSM, but cannot be output to the outside by the prism cover DPSM.

FIG. 7B illustrates that the prism cover DPSM pivots to the right and is opened in a state where the right temple LR is folded. Accordingly, the prism cover DPSM cannot protect the prism PSM.

As shown in FIG. 7B, when the prism cover DPSM is opened in a state where the right temple LR is folded, the image output from the image output unit PRO of the optical device OD may pass through the prism PSM, and may be output to the outside.

Meanwhile, when the right temple LR is unfolded, the image output from the image output unit PRO of the optical device OD may pass through the prism PSM, enter the in-coupling area IC, and may be displayed in the out-coupling area (OC) in the right eye glass 180R.

Meanwhile, the pivoting of the prism cover (DPSM) can be accomplished by a manual operation, but alternatively, can be accomplished by an automatic operation due to an electric signal.

A motor (not shown) may be required for automatic operation of the prism cover DPSM, and the controller 170 may control the motor for the prism cover DPSM.

For example, when the image projected from the optical device OD is outputted forwardly in a state where the right temple LR to which the optical device OD is attached is folded, the controller 170 may move the prism cover DPSM so as to open the prism PSM.

For another example, when the image projected from the optical device OD is not outputted forwardly in a state where the right temple LR to which the optical device OD is attached is folded, the controller 170 may move the prism cover DPSM so as not to expose the prism PSM to the outside.

Figure 8A:
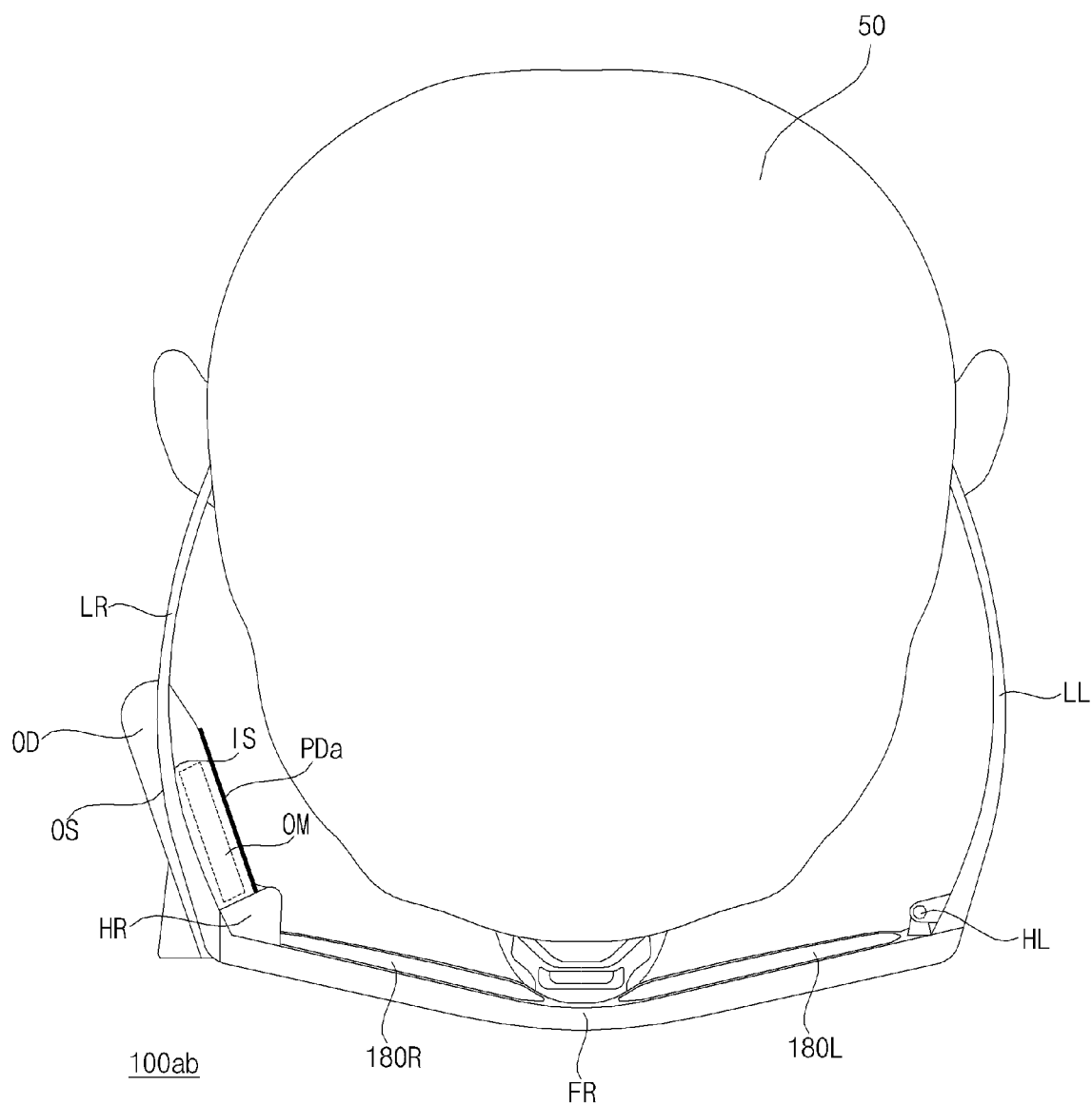
FIG. 8A and FIG. 8B are views showing an appearance of a wearable glass device according to another embodiment of the present invention.
Figure 8B:
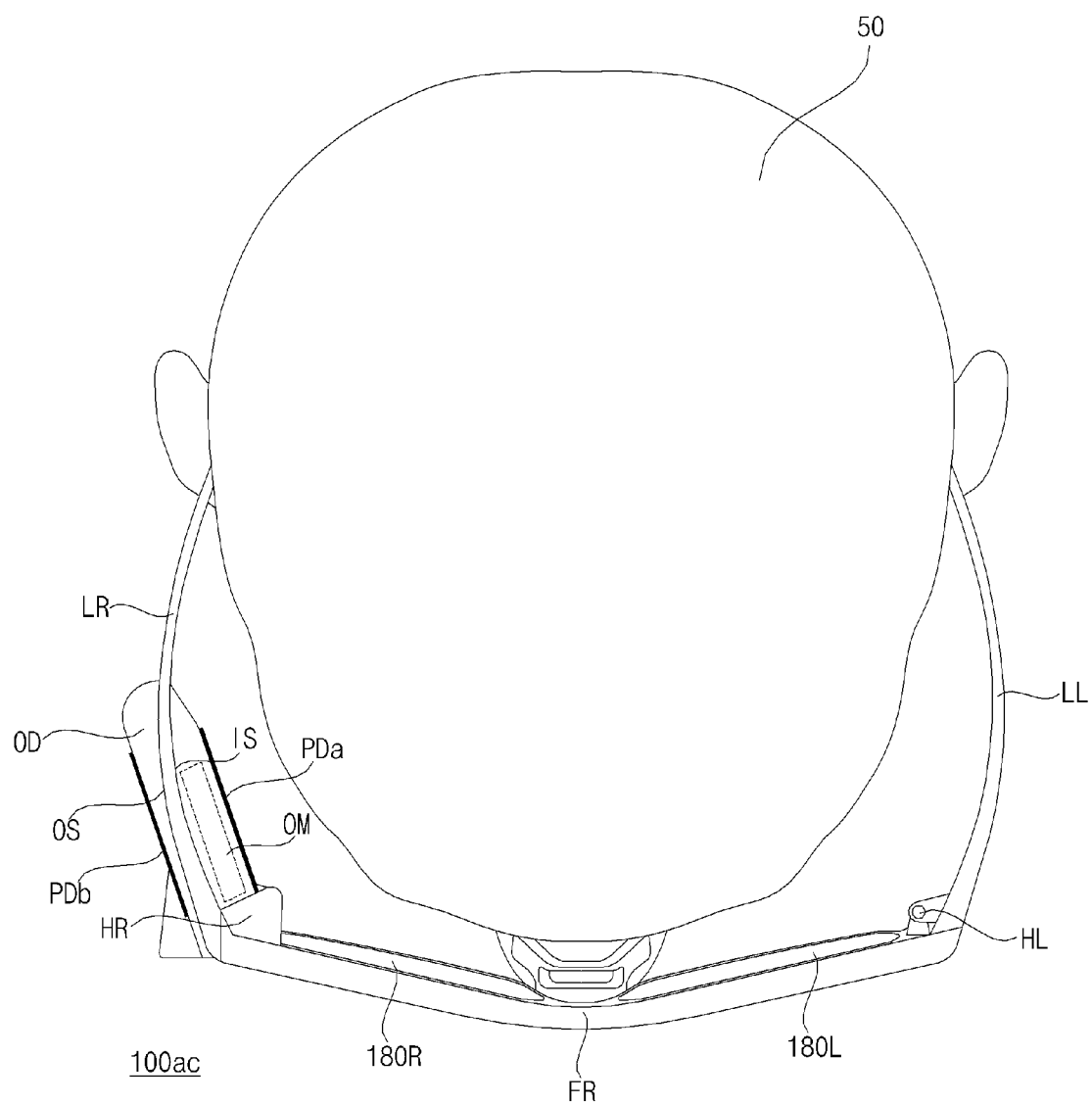

FIG. 8A and FIG. 8B are views showing an appearance of a wearable glass device according to another embodiment of the present invention.

First, a wearable glass device 100ab according to another embodiment of the present invention shown in FIG. 8A may include, similarly to FIG. 1B, a left eye glass 180L and a right eye glass 180R, a frame FR for supporting the left eye glass 180L and the right eye glass 180R, a left hinge HL and a right hinge HR connected to the frame FR and are pivotable, a left temple LL and a right temple LR connected respectively to the left hinge HL and the right hinge HR, and an optical device OD attached to the right temple LR.

Meanwhile, unlike FIG. 1B, the wearable glass device 100ab according to another embodiment of the present invention shown in FIG. 8A may further include a heat insulating member PDa which is disposed on the inner surface IS closer to the user 50 wearing the wearable glass device 100 among the inner surface IS and the outer surface OS of the optical device OD.

Thus, the user 50 wearing the wearable glass device 100ab can be protected. In particular, the user 50 can be protected from the heat generated in the optical device OD in the wearable glass device 100ab.

Next, a wearable glass device 100ac according to another embodiment of the present invention shown in FIG. 8B may include, similarly to FIG. 1B, a left eye glass 180L and a right eye glass 180R, a frame FR for supporting the left eye glass 180L and the right eye glass 180R, a left hinge HL and a right hinge HR connected to the frame FR and are pivotable, a left temple LL and a right temple LR connected respectively to the left hinge HL and the right hinge HR, and an optical device OD attached to the right temple LR.

Meanwhile, unlike FIG. 1B, the wearable glass device 100ac according to another embodiment of the present invention shown in FIG. 8B may further include an heat dissipation member PDb which is disposed on the outer surface IS farther from the user 50 wearing the wearable glass device 100 among the inner surface IS and the outer surface OS of the optical device OD.

Due to such a heat dissipation member PDb, the heat generated in the optical device OD may be quickly transmitted to the outside, and the heat generated in the optical device OD may be efficiently reduced.

Meanwhile, the wearable glass device 100ac according to another embodiment of the present invention shown in FIG. 8B may further include the heat insulating member PDa shown in FIG. 8A.

Meanwhile, although not shown in FIG. 8B, the wearable glass device 100ac may further include a fan motor and a fan (not shown) in order to efficiently reduce the heat generated in the optical device OD.

Figure 9A:
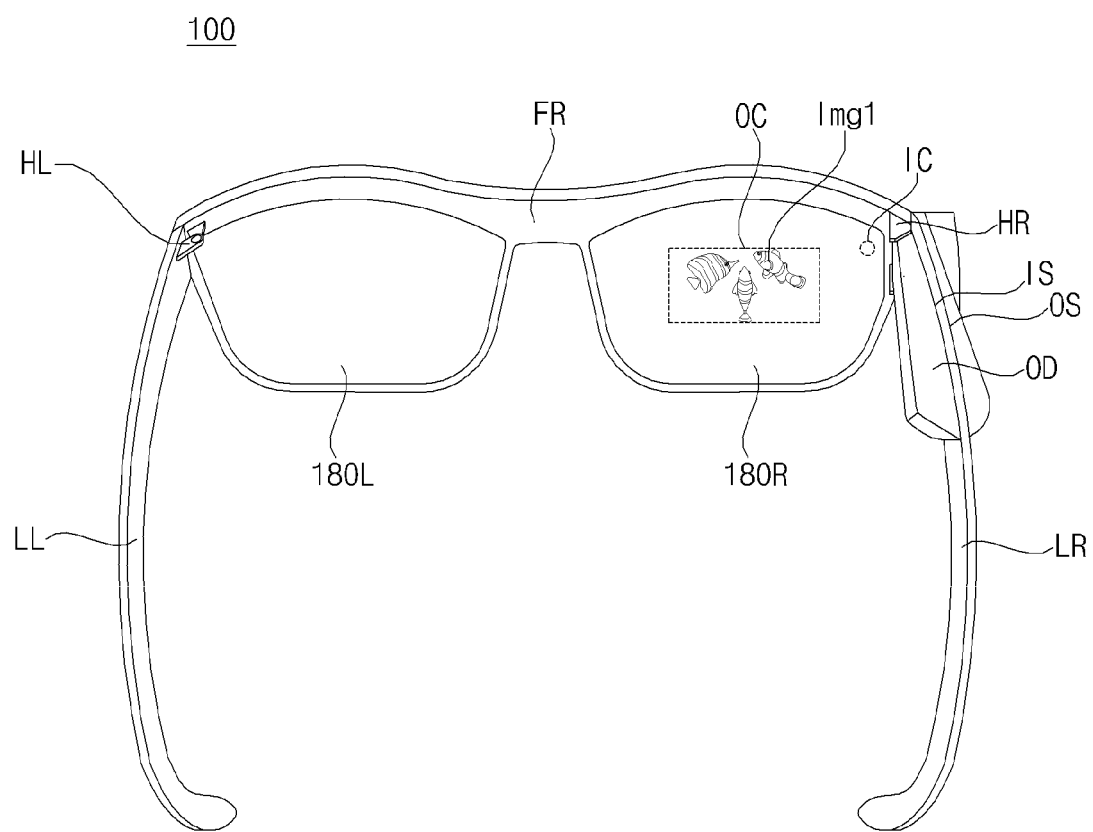
FIG. 9A illustrates a personal mode operation state of a wearable glass device.
Figure 9B:
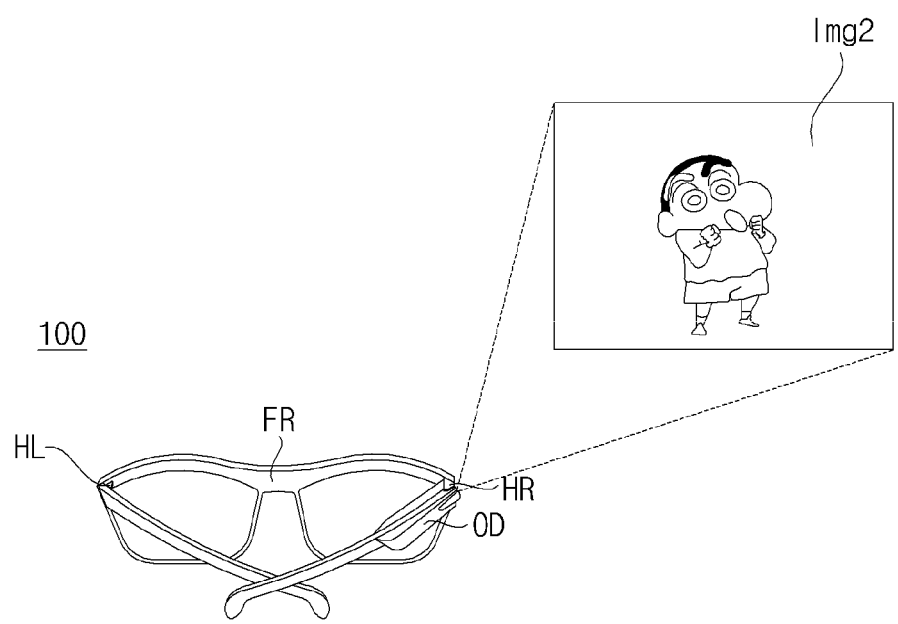
FIG. 9B illustrates a common mode operation state of the wearable glass device.

FIG. 9A illustrates a personal mode operation state of a wearable glass device, and FIG. 9B illustrates a common mode operation state of the wearable glass device.

First, referring to FIG. 9A, when the right temple LR is unfolded in a state where the optical device OD is attached to the right temple LR, the projection image Img1 output from the optical device OD may be displayed in the out-coupling area OC in the right eye glass 180R.

Thus, the user 50 wearing the wearable glass device 100 may recognize the virtual image having a focal length formed in front of the wearable glass device 100 through the out-coupling area OC in the right eye glass 180R.

Accordingly, as a personal mode, it becomes possible to provide various images or information for the wearer 50.

Next, referring to FIG. 9B, when the right temple LR is folded in a state where the optical device OD is attached to the right temple LR, the projection image Img2 output from the optical device OD may be output to the outside to be displayed.

Accordingly, as a common mode, it becomes possible to watch images, information, and the like along with people nearby.

Particularly, the wearable glass device 100 may be placed on a table to output the projection image in a state where the right temple LR is folded, so that images, information, and the like can be watched along with people nearby.

Figure 10A:
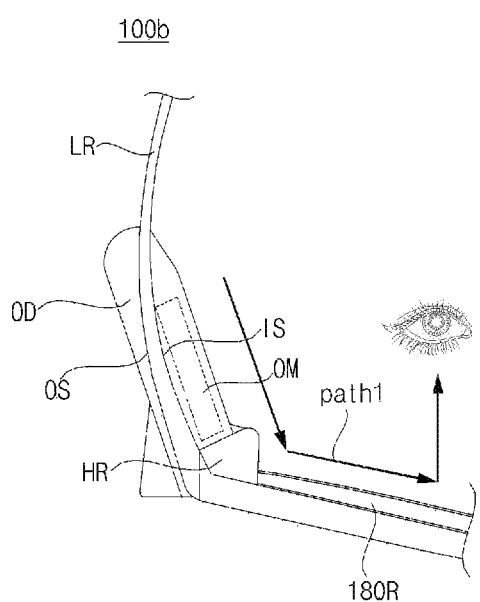
FIG. 10A and FIG. 10B are views showing an appearance of a wearable glass device according to another embodiment of the present invention.
Figure 10B:
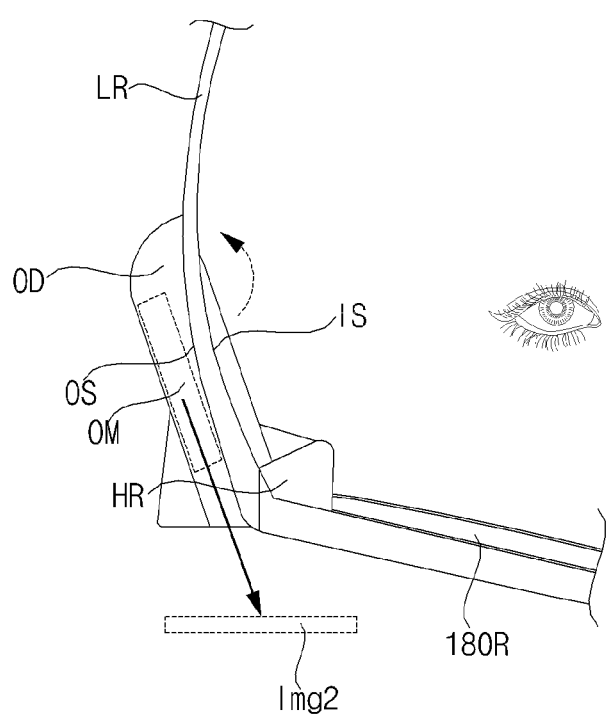

FIG. 10A and FIG. 10B are views showing an appearance of a wearable glass device according to another embodiment of the present invention.

First, a wearable glass device 100b according to another embodiment of the present invention shown in FIG. 10A may include, similarly to FIG. 1B, a left eye glass 180L and a right eye glass 180R, a frame FR for supporting the left eye glass 180L and the right eye glass 180R, a left hinge HL and a right hinge HR connected to the frame FR and are pivotable, a left temple LL and a right temple LR connected respectively to the left hinge HL and the right hinge HR, and an optical device OD attached to the right temple LR.

At this time, unlike FIG. 1B, the optical device OD may be disposed in either the attached left temple LL or the right temple LR to be pivotable.

In the drawing, it is illustrated that the optical device OD is attached to the right temple LR and disposed to be pivotable.

Meanwhile, as shown in FIG. 10A, when the optical module OM of the optical device OD is located on the inner surface IS of the right temple LR in the state in which the right temple LR is unfolded, as a personal mode, the image projected from the optical device OD may be displayed on the right eye glass 180R. Accordingly, the user 50 wearing the wearable glass device 100b can watch a corresponding image.

Meanwhile, as shown in FIG. 10B, when the optical module OM of the optical device OD is located on the outer surface OS of the right temple LR in the state in which the right temple LR is unfolded, as a common mode, the image projected from the optical device OD may be outputted and displayed forward. Accordingly, people around the wearable glass device 100b can watch the projection image together.

Meanwhile, as shown in FIGS. 10A and 10B, the optical device OD may pivot on the right temple LR so that the optical module OM of the optical device OD may be located on the inner surface IS or the outer surface OS of the right temple LR. Accordingly, the optical module OM of the optical device OD can be easily adjusted to be located on the inner surface IS or the outer surface OS of the right temple LR.

Figure 11A:
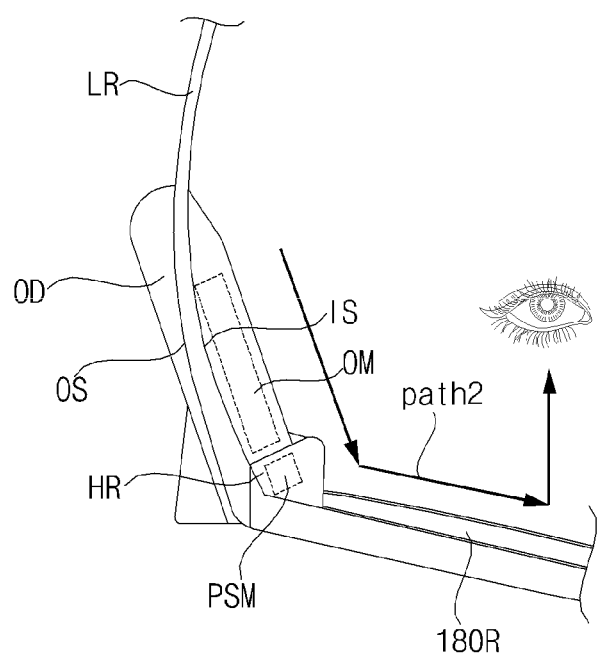
FIG. 11A and FIG. 11B are views showing an appearance of a wearable glass device according to another embodiment of the present invention.
Figure 11B:
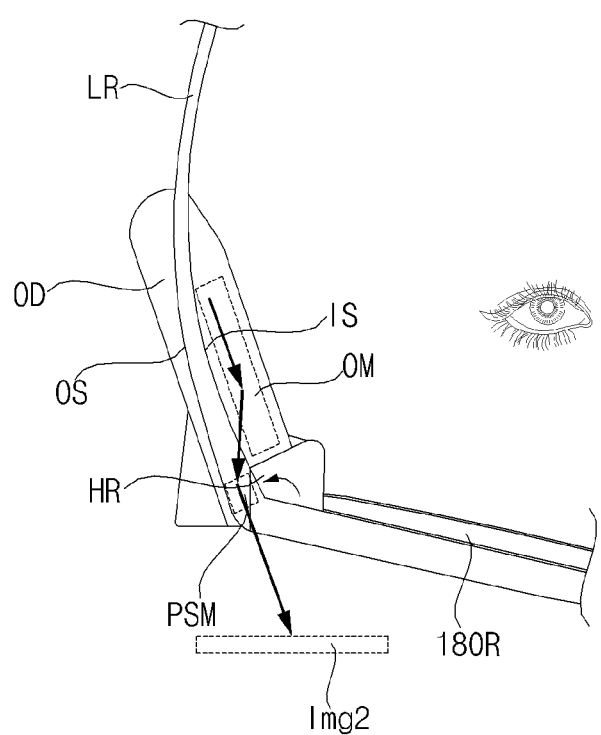

FIG. 11A and FIG. 11B are views showing an appearance of a wearable glass device according to another embodiment of the present invention.

First, a wearable glass device 100c according to another embodiment of the present invention shown in FIG. 11A may include, similarly to FIG. 1B, a left eye glass 180L and a right eye glass 180R, a frame FR for supporting the left eye glass 180L and the right eye glass 180R, a left hinge HL and a right hinge HR connected to the frame FR and are pivotable, a left temple LL and a right temple LR connected respectively to the left hinge HL and the right hinge HR, and an optical device OD attached to the right temple LR.

At this time, unlike FIG. 1B, the optical device OD may further include a prism (PSM) which is pivotably disposed between the optical device OD and any one of the left eye glass 180L and the right eye glass 180R to change the light traveling direction of the image projected from the optical device OD.

In the drawing, it is illustrated that the prism PSM is attached to the right temple LR and disposed to be pivotable.

Meanwhile, as shown in FIG. 11A, when the prism PSM is positioned corresponding to the inner surface IS of the right temple LR in a state in which the right temple LR is unfolded, as a personal mode, the image projected from the optical device OD may be displayed on the right eye glass 180R via the prism PSM. Accordingly, the user 50 wearing the wearable glass device 100c may watch a corresponding image.

Meanwhile, as shown in FIG. 11B, when the prism PSM is positioned corresponding to the outer surface OS of the right temple LR in a state in which the right temple LR is unfolded, as a common mode, the image projected from the optical device OD may be outputted and displayed forward via the prism PSM. Accordingly, people around the wearable glass device 100c can watch the projection image together.

Meanwhile, as shown in FIG. 11A and FIG. 11B, the prism PSM may be pivoted so that the prism PSM may be positioned corresponding to the inner surface IS or the outer surface OS of the right temple LR. Accordingly, it possible to easily adjust the prism PSM to be located corresponding to the inner surface IS or the outer surface OS of the right temple LR.

As described above, the wearable glass device according to an embodiment of the present invention includes a left eye glass and a right eye glass; a frame for supporting the left eye glass and the right eye glass; a left hinge and a right hinge connected to the frame and pivotable; a left temple and a right temple connected respectively to the left hinge and the right hinge; and an optical device attached to any one of the left temple and the right temple, wherein an image projected from the optical device is outputted and displayed forward, when any one of the left temple and the right temple to which the optical device is attached is folded, and the image projected from the optical device is displayed on any one of the left eye glass and the right eye glass, when any one of the left temple and the right temple to which the optical device is attached is unfolded, so that the image projected from the optical device can be output to the outside, when any one of the left temple and the right temple to which the optical device is attached is folded.

Meanwhile, as the left temple and the right temple are folded, the left temple and the right temple can be prevented from being damaged, and thus, the left temple and the right temple can be protected.

Meanwhile, the wearable glass device further includes a prism disposed between the optical device and any one of the left eye glass and the right eye glass to change a light traveling direction of the image projected from the optical device, so that the definition and the like of the image displayed on any one of the left eye glass and the right eye glass can be improved.

Meanwhile, the wearable glass device further includes a prism cover disposed between the prism and the frame, and connected to a prism hinge to be pivotable, so that the prism can be protected.

Meanwhile, the wearable glass device further includes a heat insulating member which is disposed on an inner surface which is closer to a user wearing the wearable glass device, among the inner and outer surfaces of the optical device, so that the user wearing the wearable glass device can be protected.

Meanwhile, the wearable glass device further includes a heat dissipation member which is disposed on an outer surface which is farther from the user wearing the wearable glass device, among the inner and outer surfaces of the optical device, so that the heat generated in the optical device can be efficiently reduced.

Meanwhile, the wearable glass device controls a focal point of the image projected to the outside to be varied according to the distance calculated for the external object, so that the image projection can be efficiently performed.

Meanwhile, the wearable glass device determines whether any one of the left temple and the right temple to which the optical device is attached is folded or unfolded, based on a sensing signal of the inertial sensor, wherein the controller controls at least one of resolution, luminance, and brightness of the image output from the image projection unit to be varied, depending on whether any one of the left temple and the right temple to which the optical device is attached is folded or unfolded, so that it is possible to display or project an image suitable for a personal mode or a common mode.

Meanwhile, the wearable glass device calculates a distance to an external object based on an image from the camera, and controls a focal point of the image projected to the outside according to the calculated distance to the external object, so that the image projection can be efficiently performed.

Meanwhile, the wearable glass device according to another embodiment of the present invention includes: a left eye glass and a right eye glass; a frame for supporting the left eye glass and the right eye glass; a left hinge and a right hinge connected to the frame and pivotable; a left temple and a right temple connected respectively to the left hinge and the right hinge; and an optical device attached to any one of the left temple and the right temple, wherein the optical device is disposed in any one of the left temple and the right temple attached thereto, and is pivotable, and an image projected from the optical device is displayed on any one of the left eye glass and the right eye glass, when an optical module in the optical device is located on an inner surface of any one of the left temple and the right temple to which the optical device is attached, in a state in which any one of the left temple and the right temple to which the optical device is attached is unfolded, and the image projected from the optical device is outputted and displayed forward, when the optical module in the optical device is located on an outer surface of any one of the left temple and the right temple to which the optical device is attached, in a state in which any one of the left temple and the right temple to which the optical device is attached is unfolded, so that the image projected from the optical device can be output to the outside due to the pivoting of the optical device.

Meanwhile, the wearable glass device according to another embodiment of the present invention includes: a left eye glass and a right eye glass; a frame for supporting the left eye glass and the right eye glass; a left hinge and a right hinge connected to the frame and pivotable; a left temple and a right temple connected respectively to the left hinge and the right hinge; an optical device attached to any one of the left temple and the right temple; and a prism pivotably disposed between the optical device and any one of the left eye glass and the right eye glass, and changes a light traveling direction of an image projected from the optical device, wherein the image projected from the optical device is displayed on any one of the left eye glass and the right eye glass, when the prism is located corresponding to an inner surface of any one of the left temple and the right temple to which the optical device is attached, in a state in which any one of the left temple and the right temple to which the optical device is attached is unfolded, and the image projected from the optical device is outputted and displayed forward, when the prism is located corresponding to an outer surface of any one of the left temple and the right temple to which the optical device is attached, in a state in which any one of the left temple and the right temple to which the optical device is attached is unfolded, so that the image projected from the optical device can be output to the outside due to the pivoting of the prism.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A wearable glass device comprising:
a left eye glass and a right eye glass;
a frame for supporting the left eye glass and the right eye glass;
a left hinge and a right hinge connected to the frame and pivotable;
a left temple and a right temple connected respectively to the left hinge and the right hinge; and
an optical device attached to any one of the left temple and the right temple,
wherein an image projected from the optical device is outputted and displayed forward, when any one of the left temple and the right temple to which the optical device is attached is folded, and
the image projected from the optical device is displayed on any one of the left eye glass and the right eye glass, when any one of the left temple and the right temple to which the optical device is attached is unfolded.

2. The wearable glass device of claim 1, wherein the left eye glass and the right eye glass comprise a see through lens, and
when any one of the left temple and the right temple to which the optical device is attached is unfolded, the image projected by the optical device is projected onto an in-coupling area of any one of the left eye glass and the right eye glass, and is displayed in an out-coupling area.

3. The wearable glass device of claim 1, further comprising a prism disposed between the optical device and any one of the left eye glass and the right eye glass to change a light traveling direction of the image projected from the optical device.

4. The wearable glass device of claim 3, wherein the image projected from the optical device is not incident on the prism, when any one of the left temple and the right temple to which the optical device is attached is folded, and
the image projected from the optical device is displayed on any one of the left eye glass and the right eye glass via the prism, when any one of the left temple and the right temple to which the optical device is attached is unfolded.

5. The wearable glass device of claim 3, further comprising a prism cover disposed between the prism and the frame, and connected to a prism hinge to be pivotable.

6. The wearable glass device of claim 4, wherein the prism cover is moved to open the prism, when the image projected from the optical device is output forward in a state in which any one of the left temple and the right temple to which the optical device is attached is folded, and
the prism cover is moved so as not to expose the prism to the outside, when the image projected from the optical device is not output forward in a state in which any one of the left temple and the right temple to which the optical device is attached is folded.

7. The wearable glass device of claim 1, further comprising a heat insulating member disposed on an inner surface which is closer to a user wearing the wearable glass device, among the inner and outer surfaces of the optical device.

8. The wearable glass device of claim 7, further comprising a heat dissipation member disposed on an outer surface which is farther from the user wearing the wearable glass device, among the inner and outer surfaces of the optical device.

9. The wearable glass device of claim 1, wherein the optical device comprises:
   a sensing unit which includes an inertial sensor; and
   an image projection unit which outputs the image to the outside.

10. The wearable glass device of claim 9, wherein the image projection unit comprises:
    a light source unit which outputs an output light, based on a first electric signal; and
    a scanner which sequentially and repeatedly performs a first direction scanning and a second direction scanning to output the output light to the outside.

11. The wearable glass device of claim 10, wherein the image projection unit comprises:
    a light detector which converts a reception light received in response to the output light into a second electric signal; and
    a processor which calculates a distance to an external object, based on the first electric signal and the second electric signal.

12. The wearable glass device of claim 11, further comprising a controller which controls a focal point of the image projected to the outside to be varied, according to the distance calculated for the external object.

13. The wearable glass device of claim 9, further comprising a controller which determines whether any one of the left temple and the right temple to which the optical device is attached is folded or unfolded, based on a sensing signal of the inertial sensor,
    wherein the controller controls at least one of resolution, luminance, and brightness of the image output from the image projection unit to be varied, depending on whether any one of the left temple and the right temple to which the optical device is attached is folded or unfolded.

14. The wearable glass device of claim 9, further comprising:
    a camera; and
    a controller which calculates a distance to an external object based on an image from the camera, and controls a focal point of the image projected to the outside according to the calculated distance to the external object.

* * * * *